United States Patent [19]

Ozaki

[11] Patent Number: 5,699,453
[45] Date of Patent: Dec. 16, 1997

[54] METHOD AND APPARATUS FOR LOGICALLY TAGGING OF DOCUMENT ELEMENTS IN THE COLUMN BY MAJOR WHITE REGION PATTERN MATCHING

[75] Inventor: Masaharu Ozaki, Sunnyvale, Calif.

[73] Assignees: Xerox Corporation, Stamford, Conn.; Fuji Xerox Co., Ltd., Tokyo, Japan

[21] Appl. No.: 473,909

[22] Filed: Jun. 7, 1995

Related U.S. Application Data

[63] Continuation-in-part of Ser. No. 315,857, Sep. 30, 1994, Pat. No. 5,574,802, and a continuation-in-part of Ser. No. 315,875, Sep. 30, 1994, Pat. No. 5,555,556.

[51] Int. Cl.$^6$ .................................................. G06K 9/34
[52] U.S. Cl. ...................... 382/176; 382/209; 382/173; 358/462
[58] Field of Search .................................. 382/173, 176, 382/174, 317, 209; 358/462

[56] References Cited

U.S. PATENT DOCUMENTS

| | | | |
|---|---|---|---|
| 4,698,779 | 10/1987 | Holden et al. | 382/9 |
| 4,876,728 | 10/1989 | Roth | 382/21 |
| 4,887,302 | 12/1989 | Urushibata | 382/9 |
| 5,046,114 | 9/1991 | Zobel | 382/9 |
| 5,272,764 | 12/1993 | Bloomberg et al. | 382/9 |
| 5,335,290 | 8/1994 | Cullen et al. | 382/176 |
| 5,335,298 | 8/1994 | Hevenor et al. | 382/9 |
| 5,444,797 | 8/1995 | Spitz | 382/192 |
| 5,566,255 | 10/1996 | Pavlidis | 382/317 |

OTHER PUBLICATIONS

"Page Segmentation by White Streams", T. Pavlidis et al., First International Conference on Document Analysis and Recognition, Sep. 30–Oct. 2, 1991, St. Malo, France.

"Page Segmentation and Classification", T. Pavlidis et al., CVGIP: Graphical Models and Image Processing, vol. 54, No. 6, Nov., pp. 484–496, 1992.

"Image Segmentation by Shape-Directed Covers", Baird et al., 10th Intl. Conference on Pattern Recog., Jun. 16–21, 1990, pp. 820–825.

"A Prototype Document Image Analysis System for Technical Journals", Nagy et al., Computer, Jul., 1992, pp. 10–21.

"Approximate Matching of Regular Expressions", E. Myers et al., Bulletin of Mathematical Biology, vol. 51, No. 1, 1989, pp. 5–37.

*Primary Examiner*—Jose L. Couso
*Assistant Examiner*—Anh Hong Do
*Attorney, Agent, or Firm*—Oliff & Berridge

[57] ABSTRACT

A system for logically identifying document elements from a document includes an input port for inputting a signal representing the document image, a computer having a document structural model, a document white region extraction system that extracts major white regions separating and within document elements in the input document image, a major white region selecting device and a column string selection device that generate matching column string of document elements that match the extracted major white regions in a column, a column expression comparison device that selects the best matching column string and a logical tagging device that logically tags and then extracts the document elements in the document image using the best matching column string. The method for logically identifying document elements includes providing at least one structural model of a corresponding source document, each structural model including at least one column expression defining relationships between document elements of the source document. Identifying major white regions in the input document image segmenting and defining the document elements of the document image, and assembling a major white region pattern and generating at least one column string that matches the major white region pattern for each column of the input document. Then, determining the column string that most closely matches the column expression, and logically identifying each document element of the document image based on the closest matching column string.

12 Claims, 19 Drawing Sheets

METHOD AND APPARATUS FOR LOGICALLY TAGGING OF DOCUMENT ELEMENTS IN THE COLUMN BY MAJOR WHITE REGION PATTERN MATCHING

RELATED APPLICATIONS

This application is a continuation-in-part application of U.S. patent application Ser. No. 08/315,857, filed Sep. 30, 1994 and entitled "Method and Apparatus for Document Element Classification By Analysis of Major White Region Geometry," now U.S. Pat. No. 5,574,802 and a continuation-in-part application of U.S. patent application Ser. No. 08/315,875 filed on Sep. 30, 1994 and titled "Method and Apparatus for Document Segmentation By Background Analysis," now U.S. Pat. No. 5,555,556.

BACKGROUND OF THE INVENTION

1. Field of the Invention

This invention generally relates to classifying document elements of an input document by analyzing the structure of a column in the document through comparing major white regions against a structural model. In particular, this invention relates to a method and apparatus for logically identifying document elements in a column using a structural model representing acceptable column layouts for a specific source document, document-type, or publication.

2. Background of Related Art

Conventional methods for logically identifying elements in a document image are outlined in Nagy et al., "A Prototype Document Image Analysis System for Technical Journals", pp. 10–21, Computer, July 1992. A number of techniques to analyze documents by column structure have been developed, but are based on generic assumptions about those column structures. This causes problems when the actual column structure contains differences or exceptions to the assumed generic column structure. The exceptions are not trivial to generalize because each source document has different exceptions.

Document structures can also be described by context-free grammar rules to identify acceptable source document page layouts. See Nagy et al. However, this technique requires detailed grammar rules for representing structures at different granularities, from the complex page level down to the pixel level. The representation of all levels of a document structure for a source document is complex. Thus, a simpler representation is desired.

A method and apparatus for document segmentation by background analysis has already been described in the parent application, U.S. patent application Ser. No. 08/315,875, herein incorporated by reference. This technique extracts non-rectangular document elements using major white regions from a document without consideration of the page layout.

A logical tagging technique for page images by white space pattern matching has already been described in the parent application, U.S. patent application Ser. No. 08/315,857, herein incorporated by reference.

This technique has been applied to document pages which have relatively fixed layouts. However, in order to apply it to a flexible layout in which various elements are placed in various different orders, all possible layouts must be enumerated and each different layout should be described in a corresponding document structure. Such a technique would be a successful, but cumbersome, process for the user. Thus, a simpler representation is desired.

SUMMARY OF THE INVENTION

This invention provides an accurate and efficient method for attaching logical tags, such as "heading", "body text", and "figure", to document elements in the columns of an input document using a single column structural model for each different type of document. The structure of the input document column is analyzed by matching the sequence of major white regions between and within the document elements against a structural model of a source document.

This invention also provides a system by which users are able to develop structural models and to describe relationships between document elements in a column of a document image, using information relating to the size and orientation of major white regions separating the document elements in the document column.

Major white regions are rectangular areas of "white space" having a predetermined minimum size. It should be appreciated that the term "white space" refers to the background, non-image areas or non-text areas of the document image. Since documents are usually black and/or color images on a white background, these background areas are referred to as "white spaces." However, it should also be appreciated that if the document image is on a colored background, or is white text on a black or colored background, these non-image colored or black background areas are still "white spaces" for the purposes of this invention.

Using this invention, it is not necessary to analyze portions of a document image containing document elements to determine which connected components form a coherent group, i.e., a document element. An image on a document is scanned to create an electronic or digital representation of the image. Areas containing document elements and separated from other areas containing document elements by a predetermined major white region size are assumed to be separate document elements. Document elements are rectangular areas in the document image that contain information such as headings, text, graphics, etc, which are separated from one another by the major white regions.

The structural model is a description of the specific acceptable column layouts that can occur in the source document. The structural model is represented by two types of regular expressions: column expressions and element expressions. The structural model's element expression and can be provided off-line by the users or the producers of the source document, and in advance of the actual process of tagging, or determined from actual training samples from the source document. The structural model's column expression can be provided off-line by the users or the producers of the source document, and in advance of the actual process of tagging. The acceptable column layouts for the source documents are set forth in the structural model by a column expression. The element expression represents all possible sequences of major white regions within the document element for each element type identified in the structural model and used in the column expression.

First, the document element identification system extracts all possible matches of portions of the major white region sequence or pattern from an input document image with the element expressions of a structural model. Then, at least one column string is generated for each column of the input page of the input document representing the input document page image major white regions. Then, all combinations of matching element expressions matching the input document image major white regions are tested against the column expression of the structural model. A selection device then selects the best match (i.e. most closely matching), if multiple column strings or combinations of matching element expressions are successfully tested against the column expression.

The logical tags associated with the document elements of the most closely matching column expression, based on the comparison to the input document image, are used to tag, and thus logically identify, the corresponding document elements of the input document image. Alternatively, the corresponding document elements of the input document image are segmented and output for printing or electronic storage.

Other objects and advantages of this invention will become apparent from the following detailed description taken in conjunction with the annexed drawings, which disclose preferred embodiments of the invention.

BRIEF DESCRIPTION OF THE DRAWINGS

The preferred embodiments of this invention will be described in detail with reference to the drawings, in which.

DESCRIPTION OF THE PREFERRED EMBODIMENT

Figure 1:
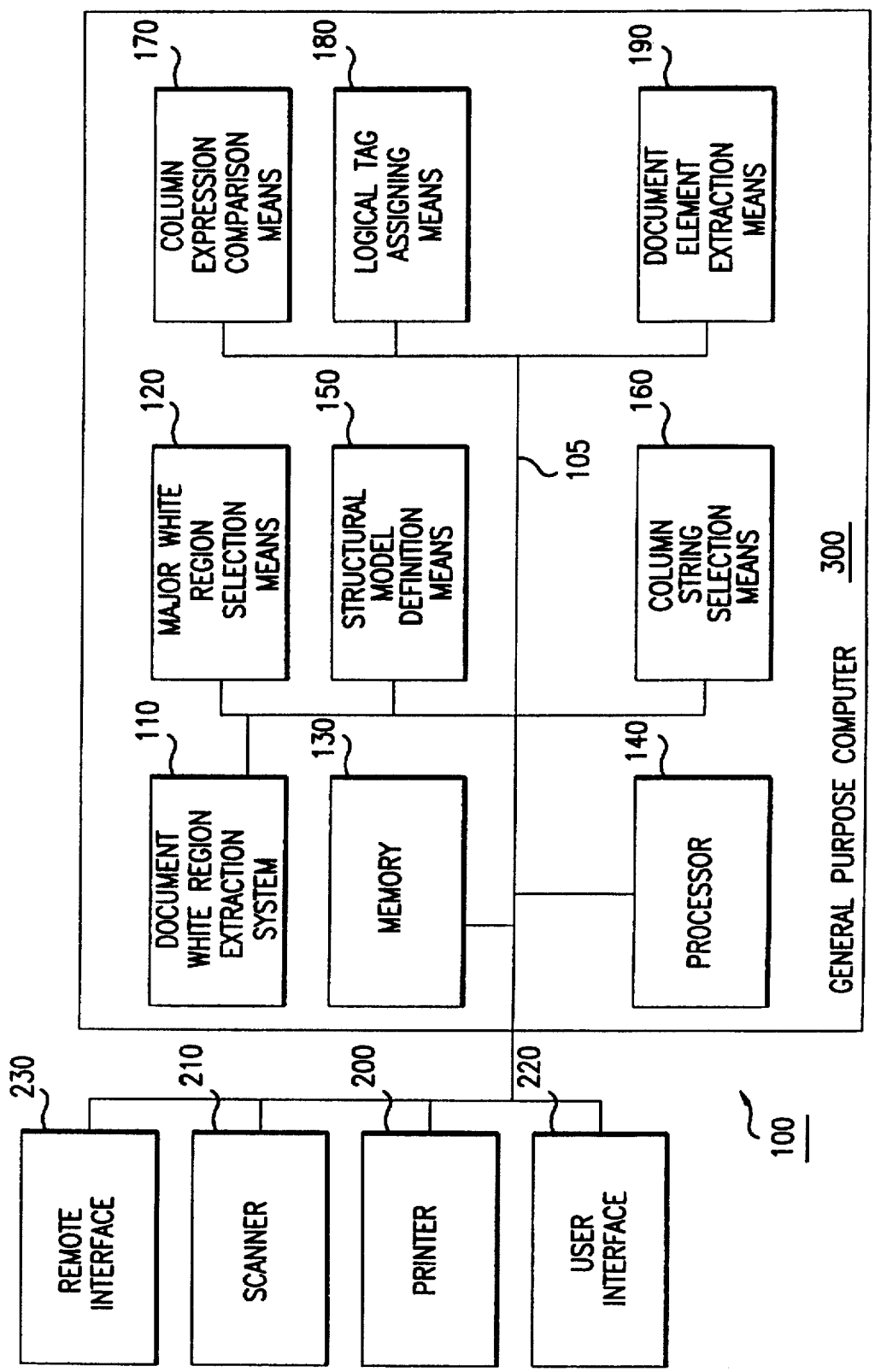
FIG. 1 is a block diagram of a preferred embodiment of the document element identification system.

FIG. 1 shows a preferred embodiment of a document element identification system 100. The document element identification system 100 includes a document white region extraction system 110, a major white region selecting means 120, a memory 130, a processor 140, a structural model definition means 150, a column string selection means 160, a column expression comparison means 170, a logical tag assigning means 180, and a document element extraction means 190, which are all connected together by a bus means 105. In addition, a printer 200, a scanner 210, a user interface 220, and a remote interface 230 are connected to the bus means 105. As shown in FIG. 1, the document element identification system 100 is preferably implemented on a general purpose computer 300. However, the document element identification system 100 can also be implemented on a special purpose computer, a microprocessor or microcontroller based system, an ASIC or other integrated circuit, a hardwired electronic circuit such as a discrete element circuit, a programmable logic device (PLD) such as a field programmable gate array, or the like.

Figure 2:
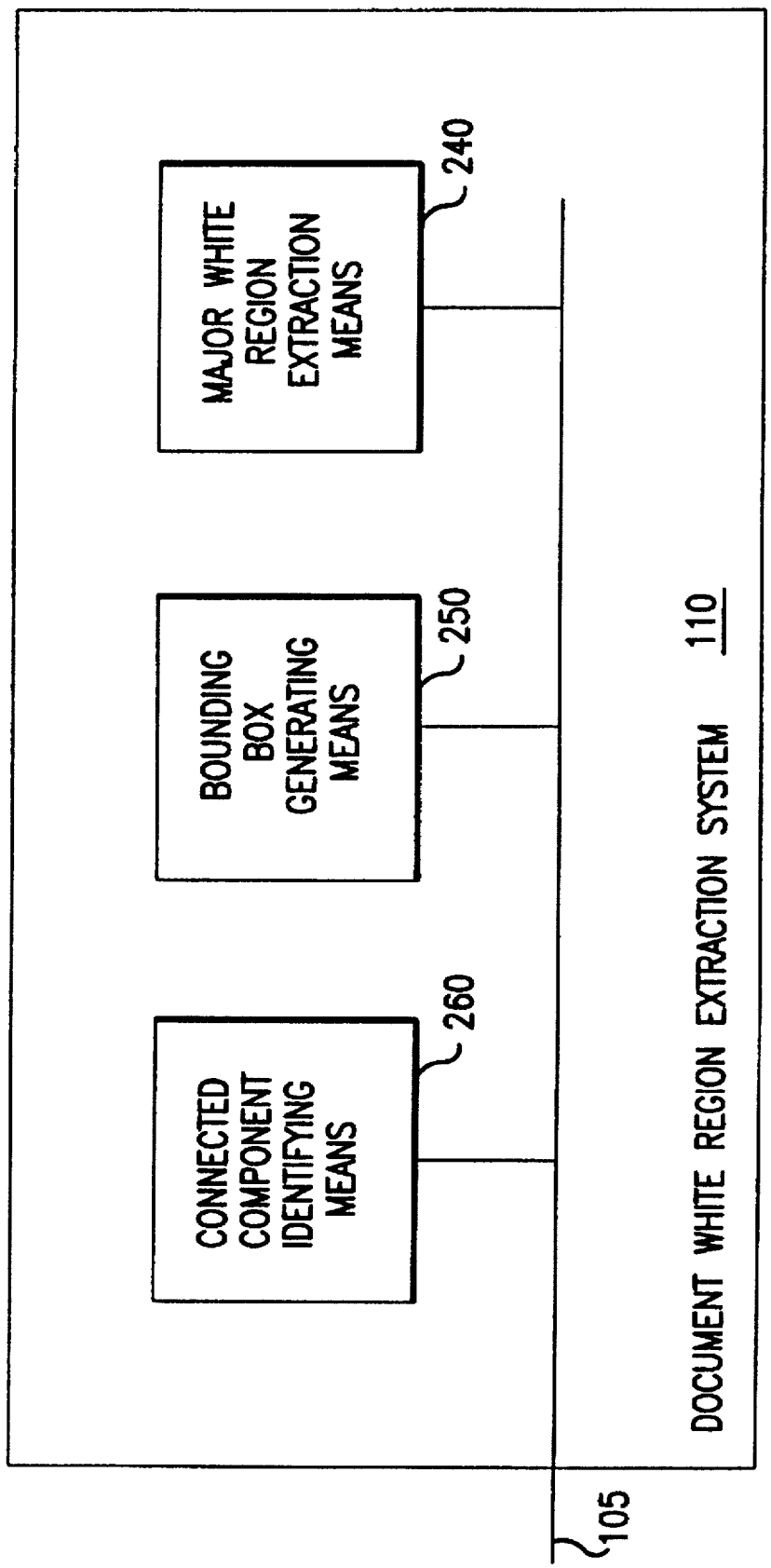
FIG. 2 is a block diagram of a preferred embodiment of the document white region extraction system of the document element identification system of FIG. 1.

FIG. 2 shows a preferred embodiment of the document white region extraction system 110 of the document element identification system 100. As shown in FIG. 2, the document white region extraction system 110 comprises a connected component identifying means 260, a bounding box generating means 250, and a major white region extraction means 240, all which are connected to the bus means 105. Document image data is first input into the connected component identifying means 260 from the scanner 210 or the memory 130. The memory 130 can be located within the general purpose computer 300 or outside of the general purpose computer 300 in the form of a disk drive, CD-ROM, EPROM, and the like, as is well known in the art. Likewise, the document image data from the scanner 210 may be first stored in the memory 130 before being input to the connected component identifying means 260. The document image data is input into the connected component identifying means 260 in the form of a binary image, or a plurality of bits of a digital signal, each set of one or more bits representing whether a particular pixel of the document image is "on" or "off."

Figure 4:
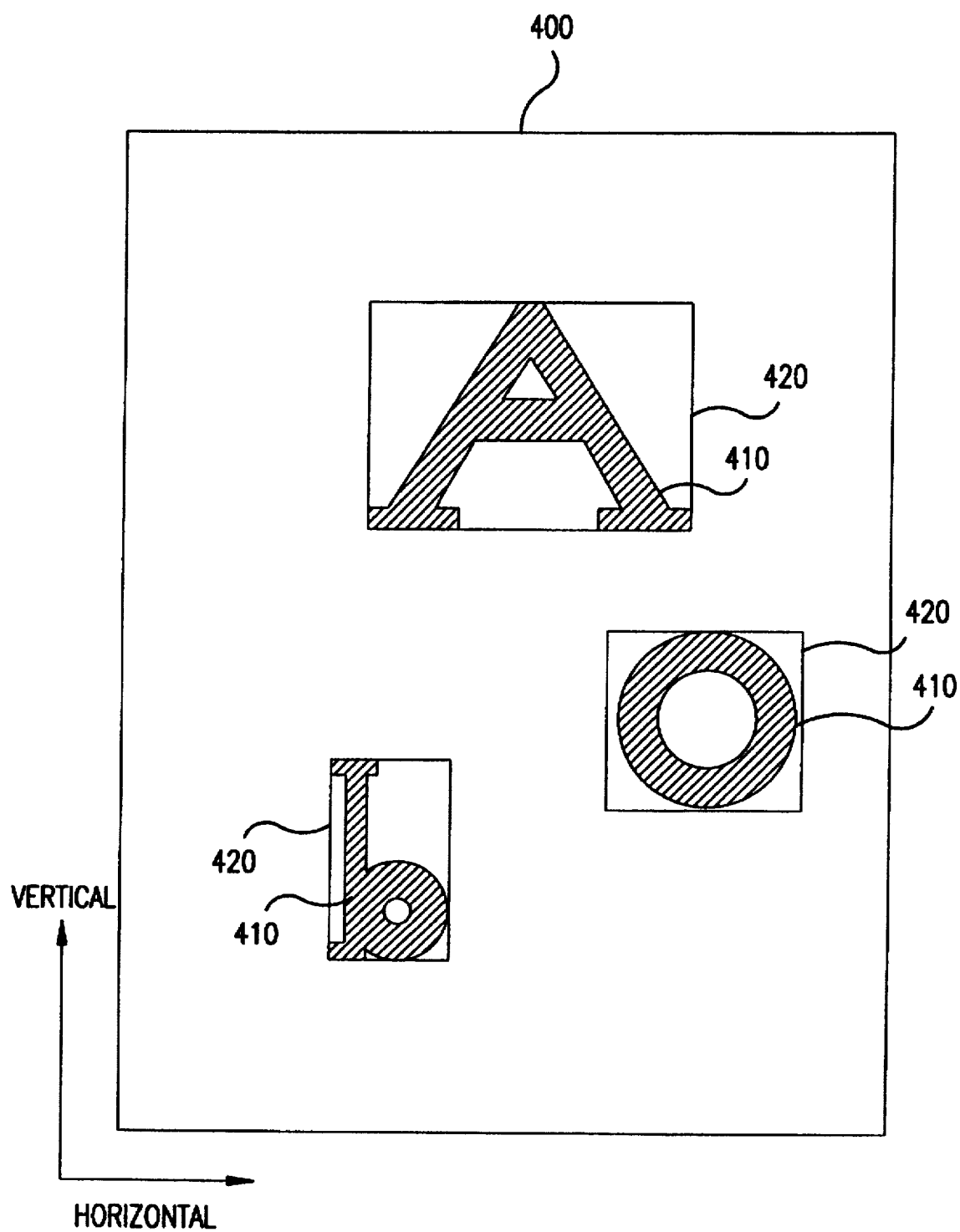
FIG. 4 shows a sample document image.

After the connected component identifying means 260 receives the document image data, the connected components identifying means 260 identifies all of the connected components in the document image. FIG. 4 shows an exemplary document image 400. The connected components 410 are found within the document image 400. Each connected component 410 comprises a series of adjacent "on" (i.e., black) pixels surrounded by "off" (i.e., white) pixels. Systems for identifying connected components 410 in document images 400 are well known in the art.

Once the connected components 410 of the document image 400 are identified, the bounding box generating means 250 generates a bounding box 420 for each connected component 410. The bounding box 420, as well known in the art, is a minimum-sized rectangular box which completely encloses the corresponding connected component 410, as shown in FIG. 4. Systems for generating the bounding boxes 420 from the connected components 410 are also well known in the art.

Figure 5:
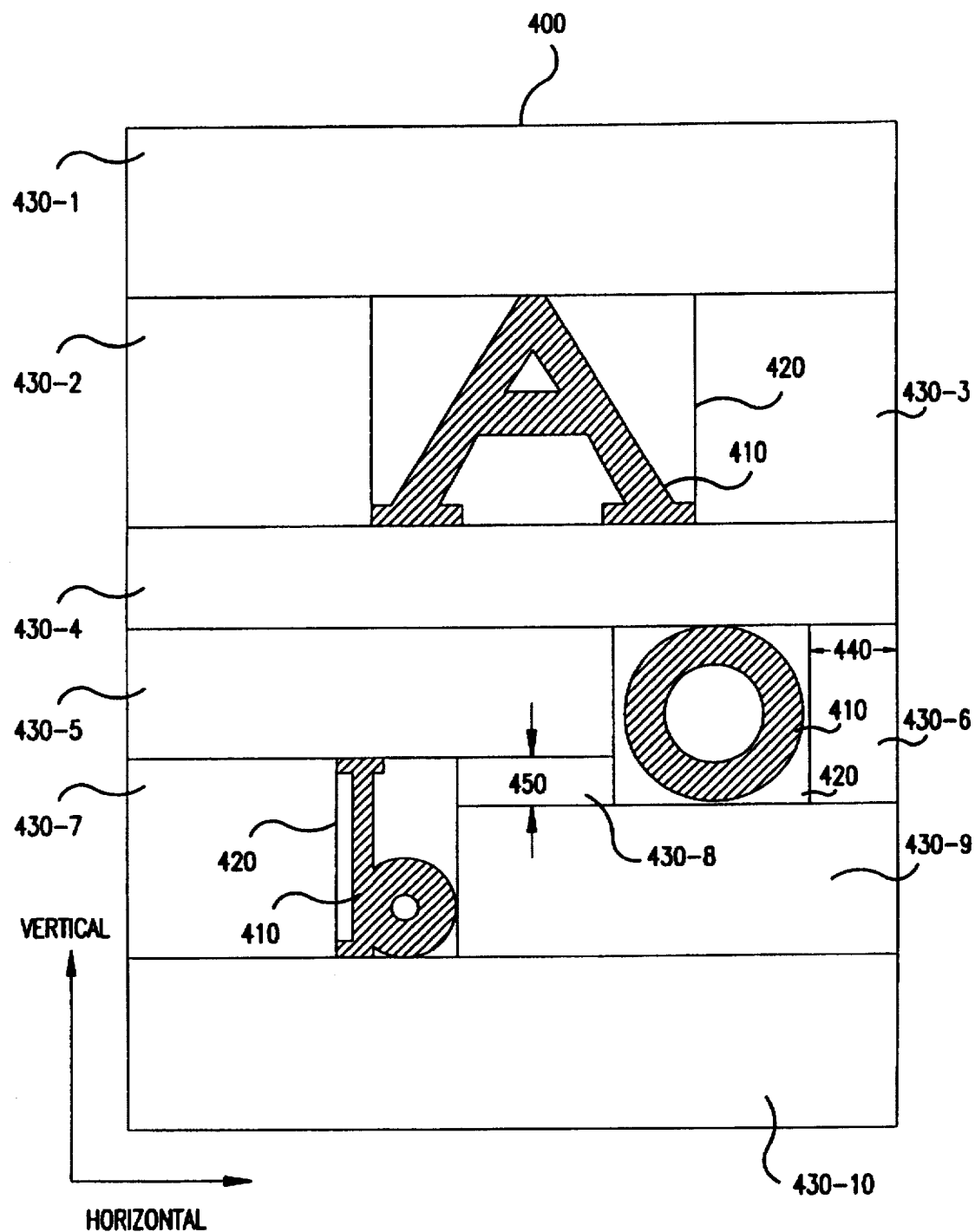
FIG. 5 shows a document image having horizontal primitive white areas extracted.
Figure 6:
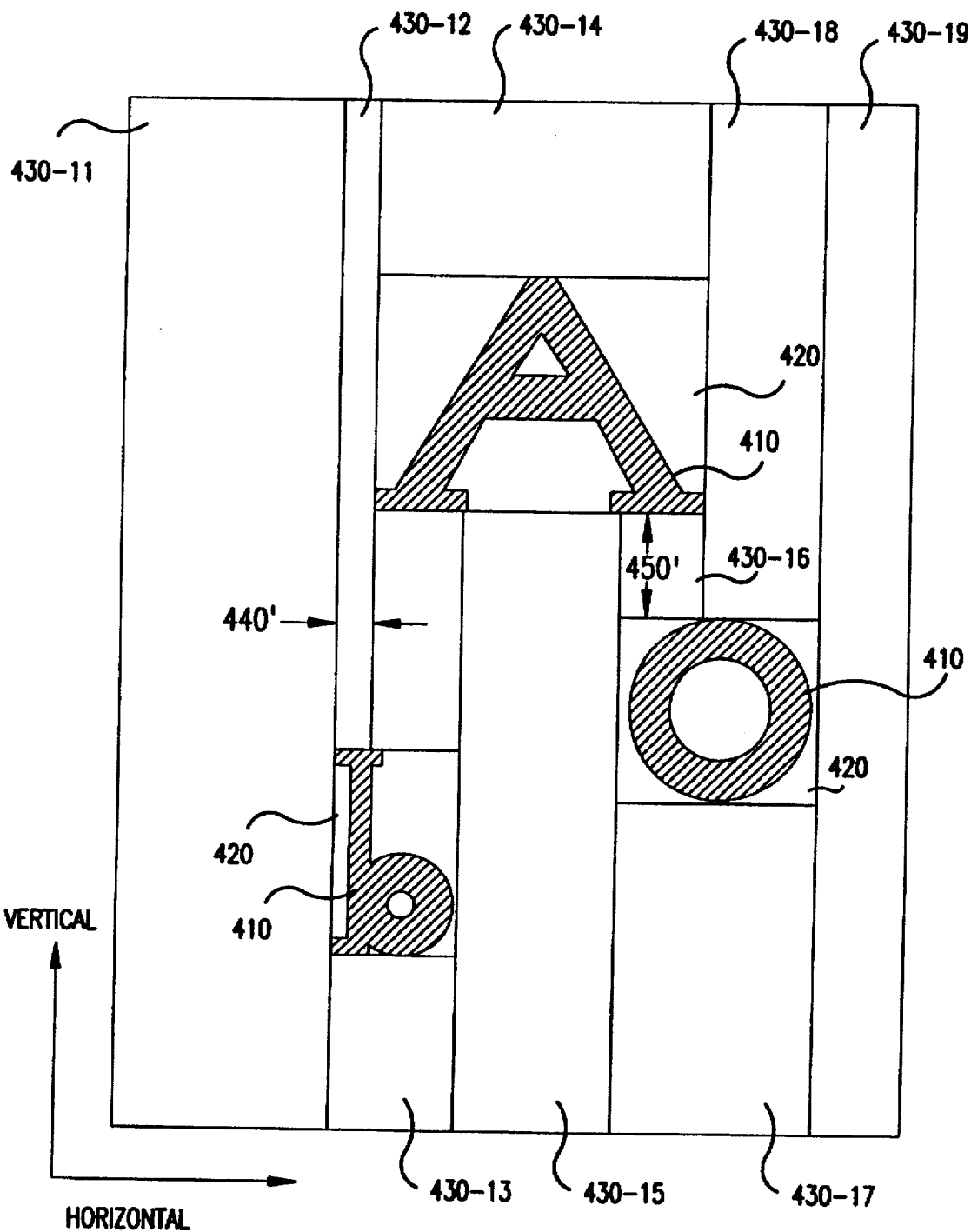
FIG. 6 shows the document image of FIG. 5 having vertical primitive white areas extracted.

The document image data with bounding box information is sent to the major white region extraction means 240, which extracts major white regions 460 in the vertical and horizontal directions of the document image 400, as shown in FIGS. 5 and 6.

Figure 3:
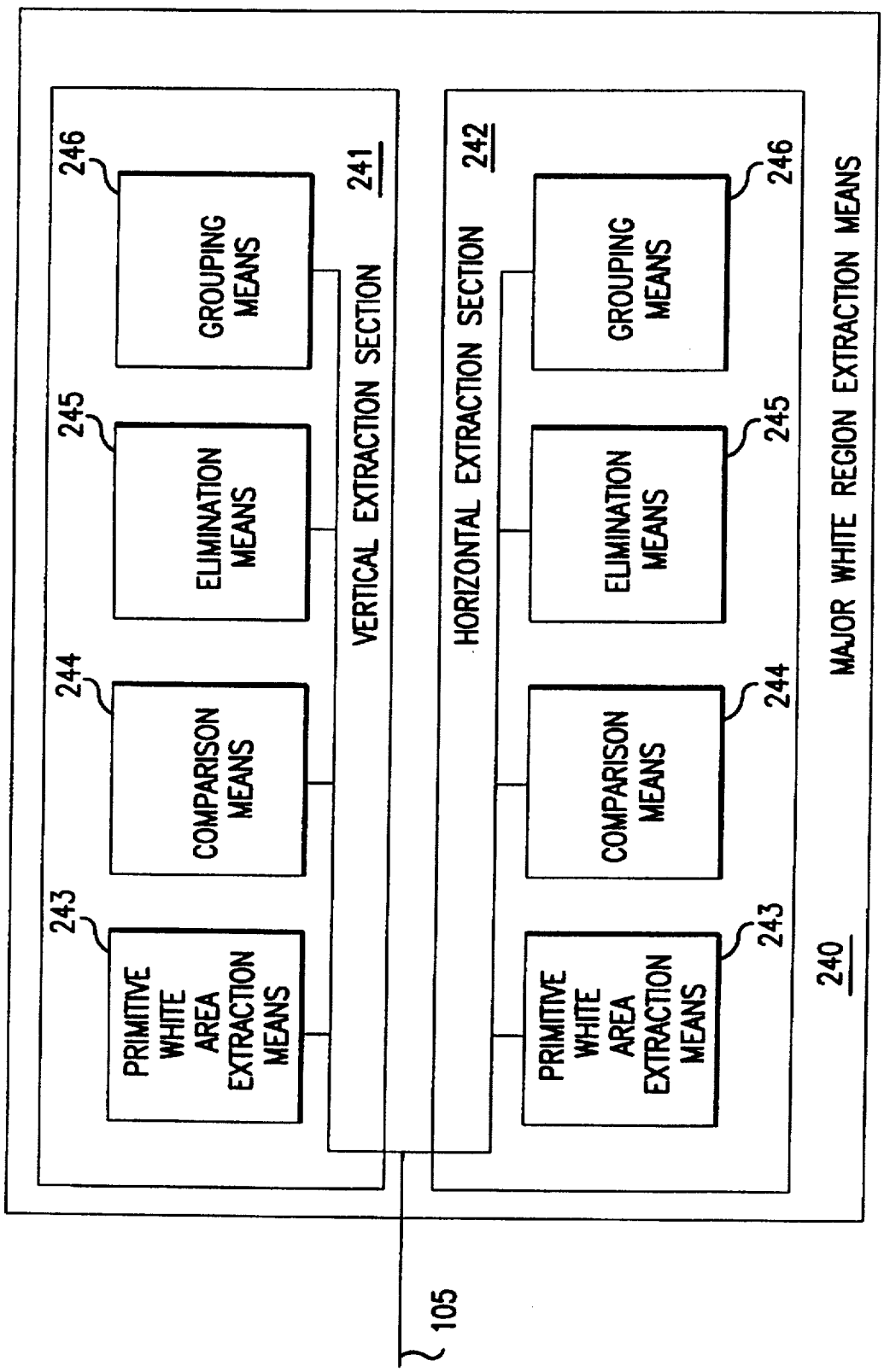
FIG. 3 is a block diagram of a preferred embodiment of the major white region extraction means.

In a preferred embodiment of the document white region extraction system 110, the major white region extraction means 240 is divided into two sections, a vertical extraction section 241 and a horizontal extraction section 242, as shown in FIG. 3. Each of the vertical extraction section 241 and the horizontal extraction section 242 comprises a primitive white area extraction means 243, a comparison means 244, elimination means 245, and a grouping means 246, each of which is connected to the bus means 105. Both the vertical extraction section 241 and the horizontal extraction section 242 contain identical components and operate in a similar fashion.

As shown in FIG. 5, the horizontal extraction section 242 first extracts primitive white areas 430-1 to 430-10 and assembles major white regions 460 in the horizontal direction. Likewise, as shown in FIG. 6, the vertical extraction section 241 first extracts primitive white areas 430-11 to 430-19 and assembles major white regions 460 in the vertical direction.

Assembling horizontal major white regions 460 is accomplished by grouping and merging adjacent ones of the horizontal primitive white areas 430-1 to 430-10 into one or more horizontally grouped primitive white areas according to specific rules. Likewise, assembling vertical major white regions 460 is accomplished by grouping and merging adjacent ones of the vertical primitive white areas 430-11 to 430-19 into one or more vertically grouped primitive white areas. After grouping and merging the vertical and horizontal primitive white areas is completed, horizontal primitive white areas 430 and horizontally grouped primitive white areas having a width greater than a width threshold 440 and a height greater than a height threshold 450, and vertical primitive white areas 430 and vertically grouped primitive white areas having a height greater than a height threshold 450' and a width greater than a width threshold 440' are identified as the major white regions 460.

Figure 7:
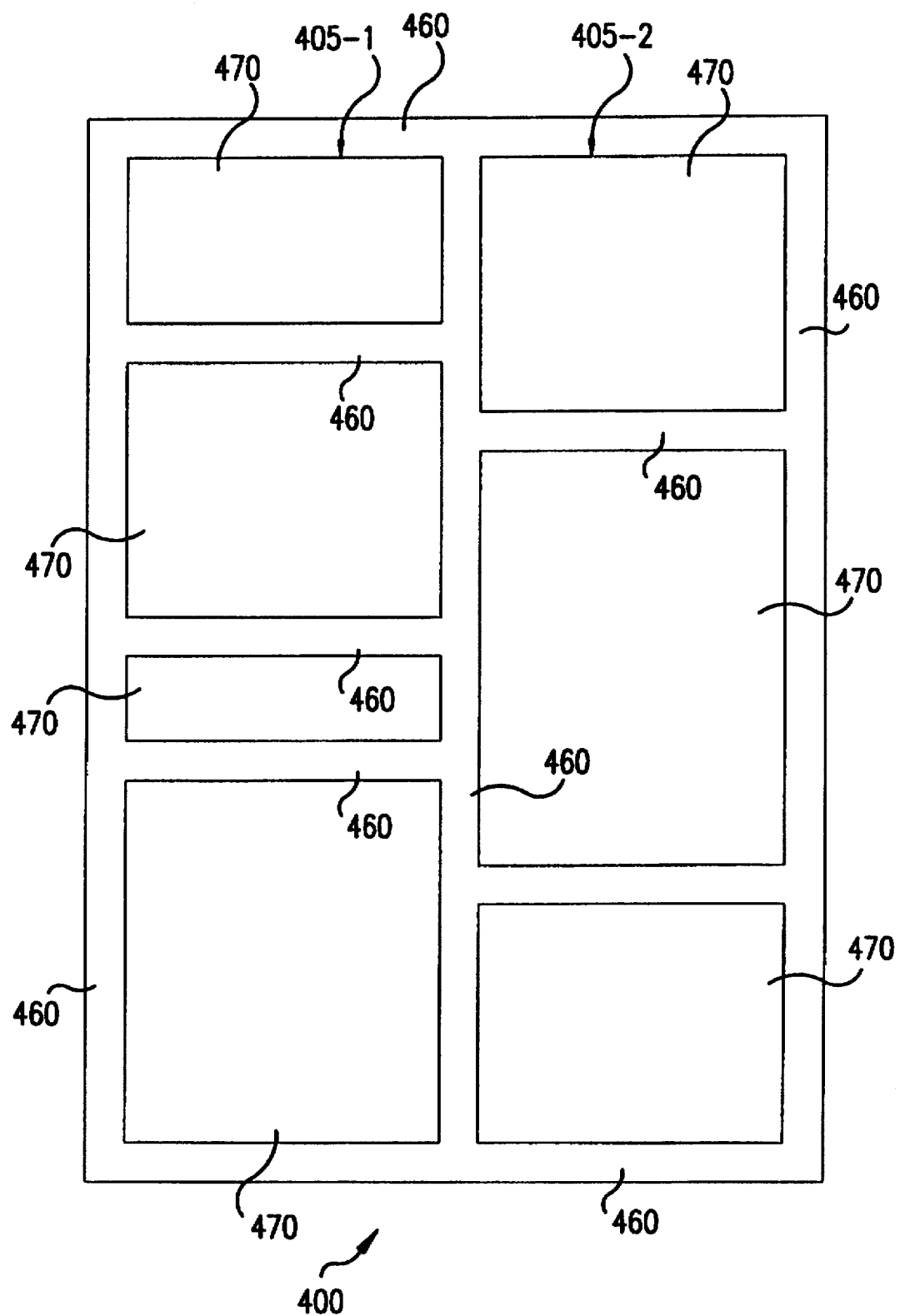
FIG. 7 shows another document image having major white regions extracted.

As shown in FIG. 7, the various document elements 470 can be grouped into columns 405 by the vertical major white regions 460. In the example document image 400 shown in FIG. 7, the document elements 470 can be grouped into two columns 405-1 and 405-2.

However, these segmented areas are not identified logically. Thus, document elements in each column should be identified by using one or more structural models.

Once the document white area extraction system 110 identifies the major white regions, the major white region selecting means 120 selects various ones of the major white regions. The structural model definition means 150 may be provided to the users to enter the structural model column expression and element expressions. The structural model definition means 150 is not required if the source document structural model is provided beforehand, for example, by the producer of the source document. The column string selection means 160 uses the selected major white regions within the document image column to identify a column string that corresponds to the sequence of major white regions in a column of the input page. The column string selection 160 means includes an element candidate extraction process to match structural model element expression to sequences of major white regions in the column of the document image. The column expression comparison means 170 compares a character string or column string generated from the selected major white regions in the document image column to the column expression of the corresponding structural model. The column expression comparison process performed by the column expression comparison means 170 includes a structure verification process and a column expression selection process for identifying the best matching column expression. Then, the logical tag assigning means 180 assigns logical tags to the areas between the major white regions based on the identified matching structural model column expression and the document element extraction means 190 extracts the logically tagged document elements 470. Alternatively, the document element extraction means 190 can be used instead of, or in addition to the logical tag assigning means 180. The logical tag assigning means 180, document element extraction means 190, and the structural model definition means are described in greater detail in the parent application Ser. Nos. 08/315,857 and 08/315,875, previously incorporated by reference.

The document white region extraction system 110 described above is only one of many contemplated embodiments for implementing the document white region extraction system outlined above. Therefore, the document white region extraction system 110 is exemplary only, and should not be construed to limit the various types and configurations of systems which can be used to implement the document white region extraction system 110.

As shown in FIG. 7, the document image 400 can contain any number of document elements 470. The document elements 470 of the document image 400 are logically identified by comparing the spatial or geometric relationships between the major white regions 460 existing between and within the document elements 470 against the spatial or geometric relationships defined in the selected structural model for each source document. If the geometric relationships between the major white regions of the document image columns 405 match the relationships defined in the structural model column expression, the document image column layout of the document elements 470 of the document image 400 is identified. The document elements 470 of the document image 400 are then extracted by the major white regions. The extracted document elements 470 are thus assigned the logical tags of the corresponding element types in the structural model column expression for that source document. The logical tags are names for the different types of document elements 470, such as "Heading", "Text", "Figure", etc. Assigning the logical tags to the document elements 470 logically identifies the document elements 470.

However, before the document elements 470 of the document image 400 can be logically identified, the document element identification system 100 must be provided with one or more structural models for each source document. Each structural model includes the corresponding document element types and the spatial or geometric relationships between the document elements of the corresponding source document.

A structural model is a description of the structure which represents acceptable or legal layouts of columns. The structural model is represented by two kinds of regular expressions: column expressions and element expressions. For any source document, the column expression represents all possible and acceptable element type sequences in each column for that source document. The element expression represents all possible and acceptable sequences of major white regions for each element type for that source document. The element expression definitions can be included in the column expression. The structural model is provided for each specific source document, because each source document is assumed to have different, but known, column layout rules. The structural model column expression in the preferred embodiment is for a one-column page layout.

However, the apparatus and methods disclosed are applicable to a two-column layout, a three-column layout, or generalized to a n-column layout. In the preferred embodiment, it is assumed that the document element identification system 100 is provided with the source document, which provides the columnar document image whose document elements are being logically tagged.

Document elements are ordered from the top of the column to the bottom of the column. The position of each document element in the column is determined according to the column layout rules of the structural model for each source document. Each acceptable or legal column layout of each source document column are represented by at least one column expression. Each column has a top and a bottom. Further, each source document contains a set of allowed document element types, such as "heading" and "text". Finally, in the preferred embodiment, the source document user is assumed to have provided the set of rules defining the range of acceptable column layouts in the structural model for the source document. Alternatively, the column expression for each source document can be provided by, for example, the creator or source of the source document.

An example of regular expressions for element types and columns is described below. The regular expression provided for the column or the structural model column expression is set forth in Equation (1):

$$\text{Column} = \hat{} * (H?TF)(HT)*F*\$. \tag{1}$$

Figure 8:
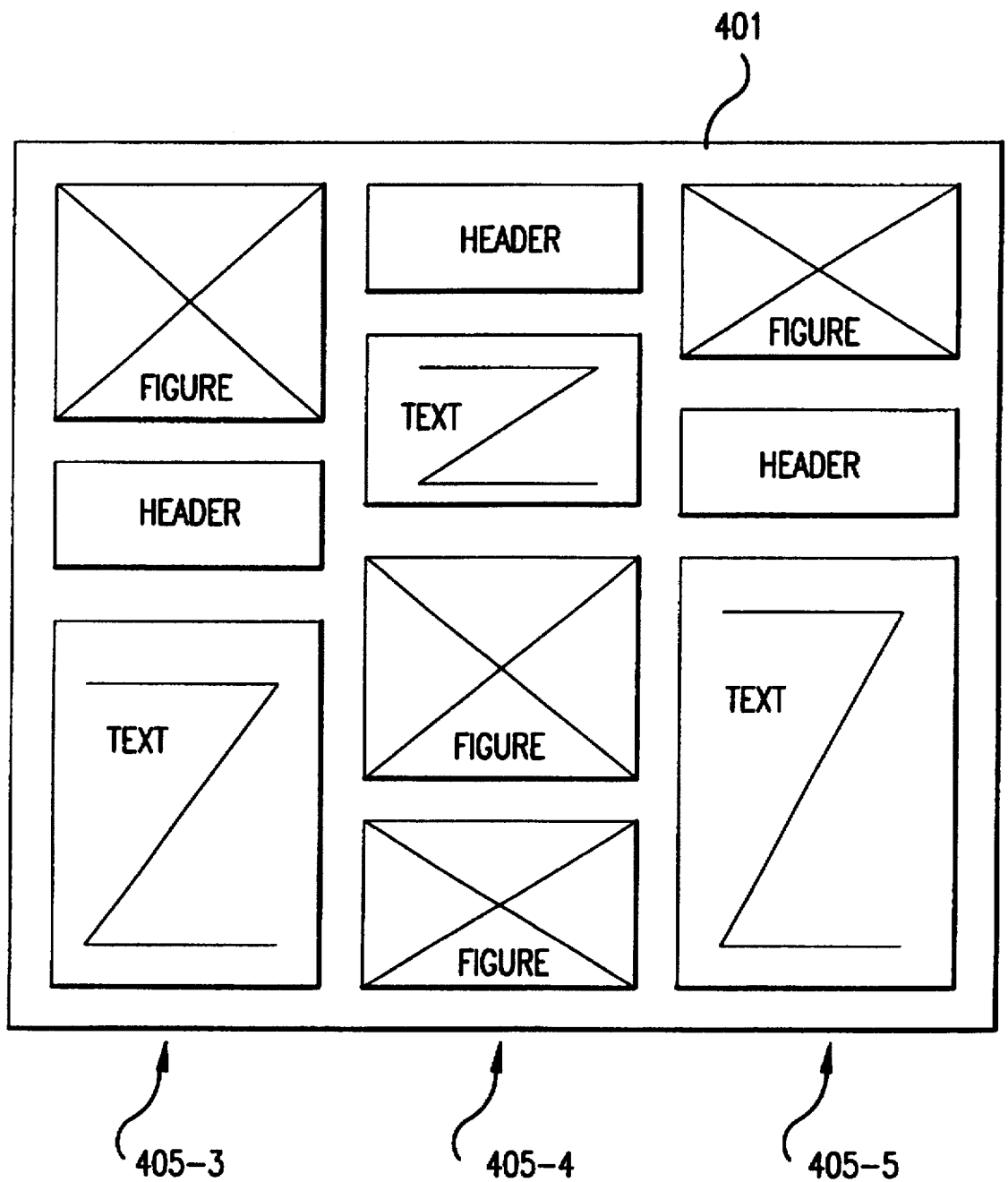
FIG. 8 is a sample document showing examples of column layouts for a given column expression.

Therefore, the set of acceptable document element types includes "heading", "figure" and "text". Further, the rules for the source document are:

1. no heading is placed at the bottom of a column;
2. at least one text block or figure is placed in each column;
3. a text block must be placed below a heading block; and
4. a sequence, containing at least one figure, must touch the top or the bottom of the column. The symbols, H, T, and F represent, respectively, the document elements "heading", "text", and "figure". The symbol "^" represents the top of the column or the beginning of the column expression. The symbol "$" represents the bottom of the column or the end of the column expression. The symbol "?" indicates that the previous expression is optional. The symbol "*" indicates the previous expression can be repeated an indefinite number of times or may not appear. That is, "*" indicates the preceding expression can appear zero, once, or more than once. "|" means logical OR. Parenthesis are used to override the "natural" precedence of operators, which places "*" highest, concatenation next, and "|" last. FIG. 8 shows three acceptable column layouts 405-3, 405-4 and 405-5 for a particular source document 401. The three instances of element sequences corresponding to each acceptable column 405-3, 405-4 and 405-5 are set forth in Equations (2)–(4), respectively:

$$\text{Column} = FHT, \tag{2}$$

$$\text{Column} = HTFF, \text{ and} \tag{3}$$

$$\text{Column} = FHF. \tag{4}$$

A similar process can be used to define an element expression for each identified element type used in the structural model for each source document. The element expression for each element type for the source document is preferably provided by the users of the source document. Each element type corresponds to a category or type of document elements having an identical logical tag, i.e. "heading". Every element type is represented by a regular expression of the form set forth in Equation (5):

$$\text{Element} = AW*B. \tag{5}$$

where "element" is the element type, such as "text" or "heading," and each symbol A,W,*, and B represents a regular expression. In particular, "A" represents a regular expression matching a character code assigned according to the size of the major white region placed above the document element. "B" represents a regular expression matching a character code assigned according to the size of the major white region placed below the document element. "*" is the repeat operator. "W" represents a regular expression matching a character code assigned according to the size of the major white regions placed within the document element. The repetitive form "W*" can be replaced with a range for the number of repetitions, if the range is known. For example, W{0,3} indicates "W" can be repeated from zero to three times.

The element type "text" located in the middle of a column is represented by the regular expression set forth in Equation (6):

$$[f-g][a-b]*[f-g]. \tag{6}$$

where the codes "a", "b", "f", and "g" correspond to 3 point, 5 point, 16 point and 20 point line spacing, respectively. Since these values can be obtained from sample data, the element expressions can be automatically generated from analysis of sample data for each source document.

Each text has 3–5 points of line spacing between adjacent lines and is separated by 16–20 points of line spacing from the adjacent document elements above and below.

Figure 9:
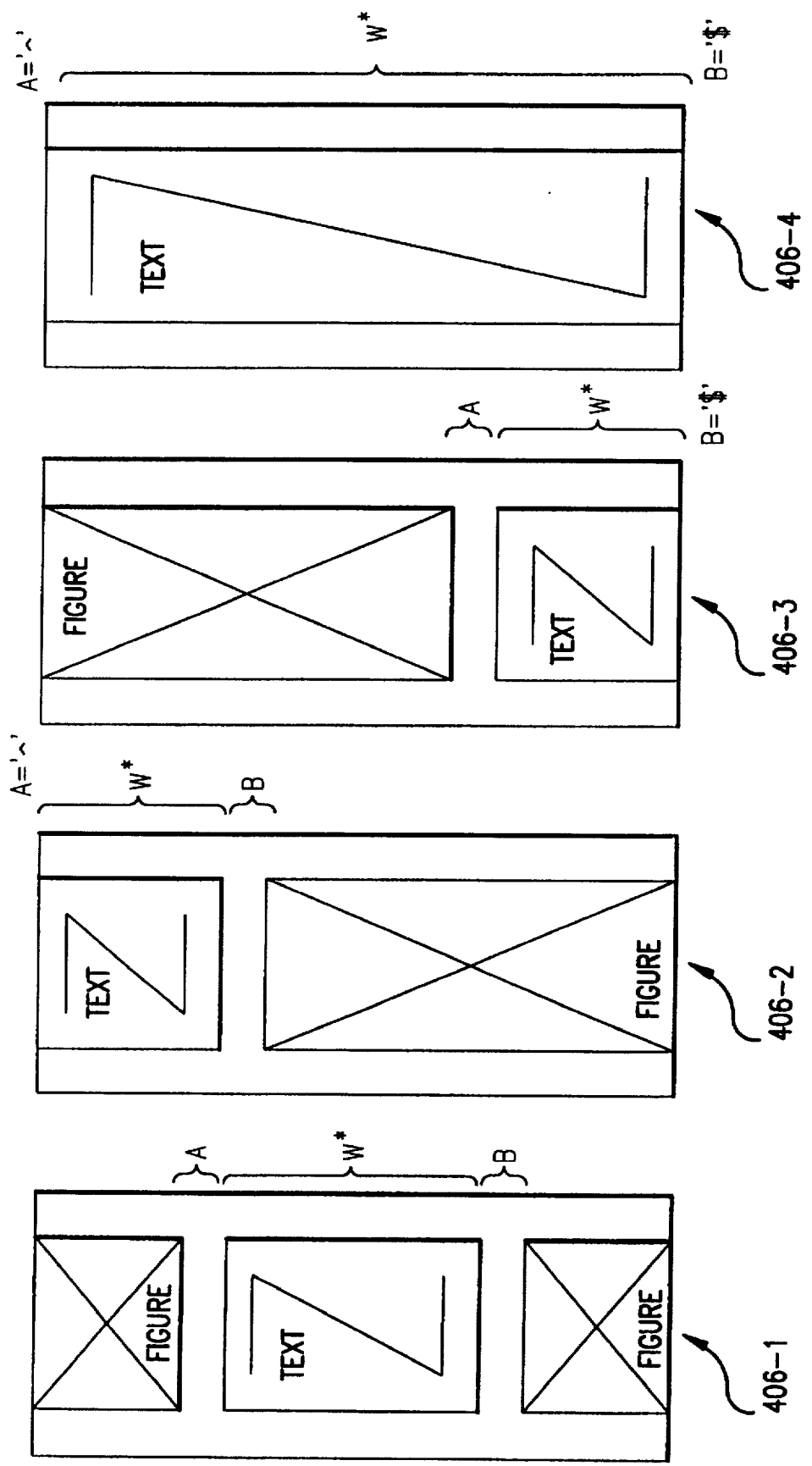
FIG. 9 shows three sample body text elements.

In FIG. 9, in document element 406-1, the text is within the column. In document element 406-2, the text must extend from the top of the column. Therefore, the element expression begins with the symbol "^". In document element 406-3, the text must extend to the bottom of the column. Therefore, the element expression ends with the symbol "$". Finally, in document element 406-4, the text must both extend from the top and extend to the bottom of the column. Therefore, the element expression both begins with the symbol "^" and ends with the symbol "$".

FIG. 9 shows the four example placements of "text" document elements 406-1, 406-2, 406-3 and 406-4, each of which correspond, respectively, to the regular expressions set forth in Equations (6)–(9):

$$\text{Text} = \hat{}[a-b]*[f-g], \tag{7}$$

$$\text{Text} = [f-g][a-b]*\$, \tag{8}$$

and $$\text{Text} = \hat{}[a-b]*\$. \tag{9}$$

These four regular element expressions can be concatenated, or logically ORed together, to obtain the element expression for this element type "text" example. In other words, the regular expression set forth in equations (6)–(9) can be combined into a single element expression encompassing all four placements, as set forth in Equation (10):

$$\text{Text} = [f-g][a-b]*[f-g]|\hat{}[a-b]*[f-g]|[f-g][a-b]*\$|\hat{}[a-b]*\$. \tag{10}$$

An element expression is required for each identified element type used in the source document. Each element expression is compared against the input document image major white region space string by the column expression comparison means 470. In this example, the text element has only the one format of 3–5 points of line spacing between adjacent lines and separated by 16–20 points of line spacing from the document elements above and below. However, the text element can be located at the top, bottom, throughout, or within the column. Additional occurrences of the document element within the document column, text in this example, can be represented by repeating Equation (6).

Element expressions can be generated from training or sample data. The element expressions can be determined from the size range of the major white regions defining the document elements obtained from actual images of the acceptable element types in the source document. However, column expressions should be provided by a creator of source document or a user who carefully examines column structures.

In the preferred embodiment, the structural model is predefined and prestored in a structural model storage section of the memory 130 before the document element tagging process is begun for an untagged or unanalyzed document 500. Therefore, the column expression and the element expressions for each element type are stored with the structural model stored in the structural model storage section of the memory 130.

Figure 10:
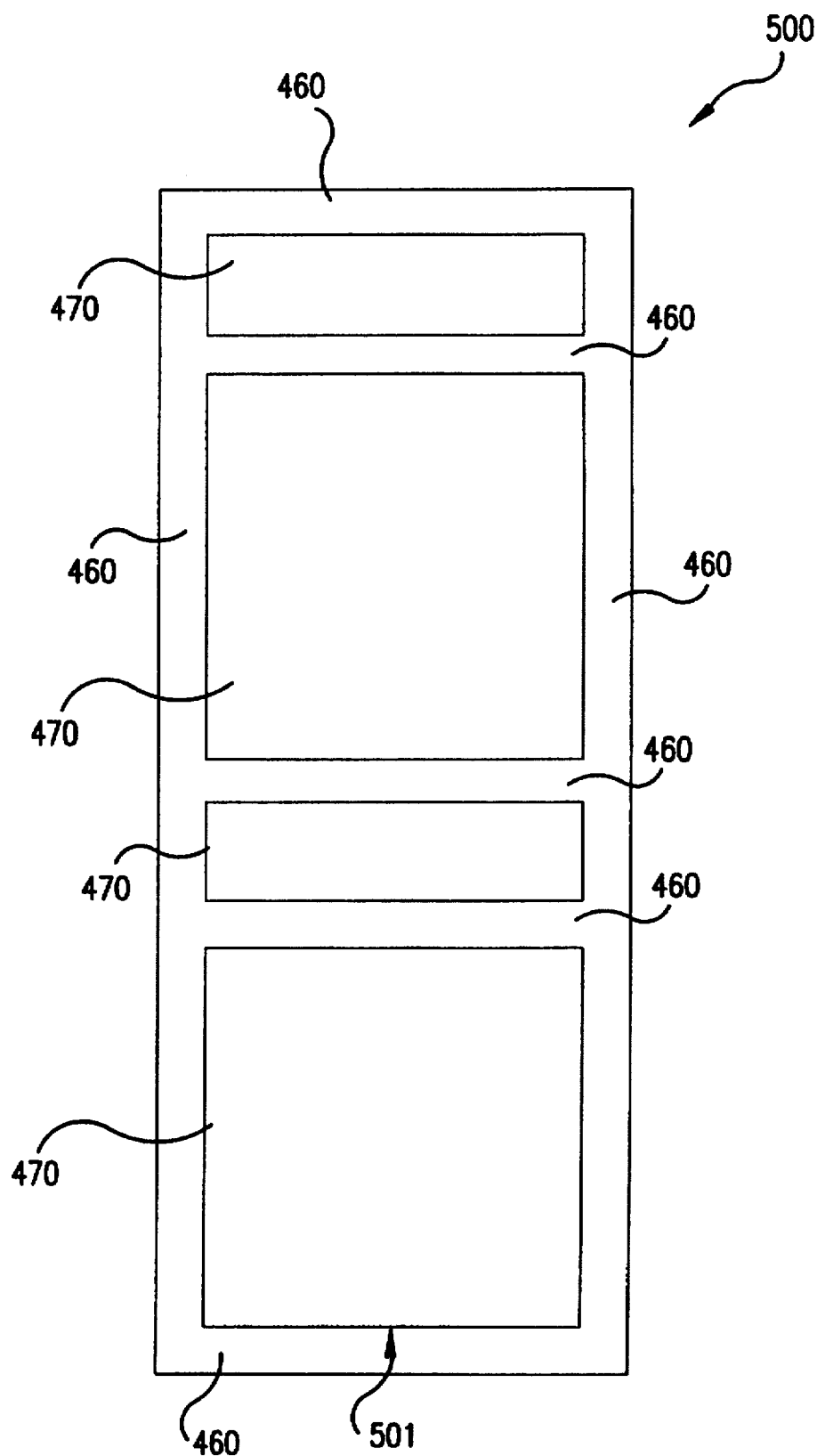
FIG. 10 is a diagram of an unanalyzed input document image column.

Using the one or more structural models stored in the memory 130, the unidentified document elements 470 of an unanalyzed document image 500 are identified, as shown in FIG. 10. The unanalyzed document image 500, which includes unidentified document elements 470 that need to be logically identified, is input through either the scanner 210 or the remote interface 230. The major white regions are extracted from the unanalyzed document image 500 by the document white region extraction system 110. The major white regions are sent to the major white region selecting means 120. The major white region selecting means 120 selects the major white regions that are used in the comparison between the column expression and the unidentified document elements in the unanalyzed document image 500. More accurately, the sequence of the major white regions are matched against the structural model.

One method to perform the comparison is to iteratively use in succession the document white region extraction system 110 and the major white region selection means 120 to extract and select the major white regions from the document image to segment the document image into columns. After modifying the major white region threshold values, the identified columns can then be input into the document white region extraction system 110 and the major white region selection means 120 for each identified column in the input document image. Then, the major white regions extracted and selected within the column, are used to determine a space string for the column. The space string is input into the column string selection means 160. Alternatively, the document image could be input into the apparatus identified in the co-pending application, U.S. patent application Ser. No. 08/483,765, herein incorporated by reference, that determines columns in a multi-column document image containing non-rectangular document elements. The columns identified by that apparatus could then be input into the document element identification system 100, i.e. the column string selection means 160.

Figure 11:
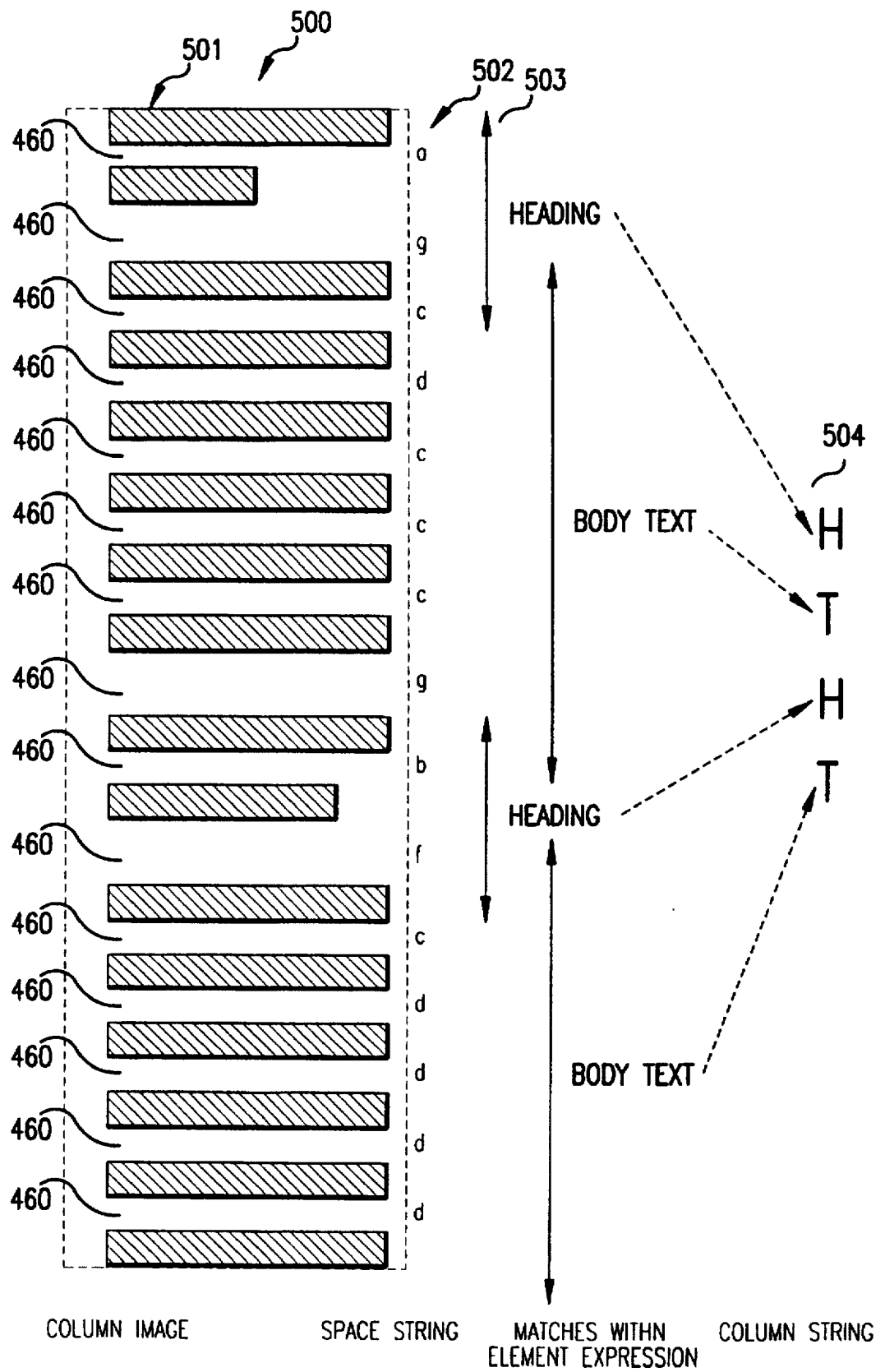
FIG. 11 is a diagram showing an input document image space string compared to element expression to identify a matching column string.

For example, in the unanalyzed document image 500 shown in FIG. 10, the major white region selecting means 120 first identifies the vertical major white regions 460 extending between the top and bottom edges of the unanalyzed document image 500. The major white region selecting means 130 then selects each pair of adjacent identified vertical major white regions 460 to identify each image column 501 of the unanalyzed document image 500. The image column 501 is then input into document white region extraction system 110 and the major white regions are sent to the major white region selection means 120. Then, the horizontal major white regions 460 existing between the selected pair of vertical major white regions 460 defining the column image 501 in the unanalyzed document image 500 are selected by the major white region selecting means 120, as shown in FIG. 11. The major white region selecting means 120 then assigns a character code to each horizontal major white region 460 of the column image 501 based on a vertical height, as shown in FIG. 11. The character codes assigned to the horizontal major white regions 460 of the column image 501 are then concatenated into a space string 502 corresponding to or representing the column image 501 of the unanalyzed document image 500. The space string 502 defines the sequence of major white regions 460 which are to be compared against the column expression and the element expressions of the structural model. In this example, the space string 502 of the column image 501 is "agcdcccgbfcdddd", as shown in FIG. 11.

This space string 502 uses only the horizontal major white regions 460 and is used to geometrically relate the horizontal major white regions 460 in an above-below relationship. The structural model is provided for describing "physical" column structure. If consecutive columns are concatenated, the columns are first segmented before the character string is determined. Alternatively, the multiple column image can be first represented by a one dimensional character string. Then, the character string is compared to the structural model. U.S. patent application Ser. No. 08/315,857, previously incorporated by reference, discloses how to determine a character string for a more complex document image, for example, a two-column document image, by using a horizontal left-right relationship.

Once the space string 502 for the unanalyzed document image 501 is determined, the unidentified document elements 470 in the unanalyzed document 500 represented by the space string 502 must be compared or matched to the structural model. First, the structural model's element expressions for each element type are compared to the space string 502 to locate any element type that matches some portion of the space string. This is also shown in FIG. 11, by the element type list 503. Then, the document element extraction system 100 determines any possible column strings 504 of the column 501 that match the entire space string 502. The column string 504 is any combination of structural model element types that, in sequence, form a column of the source document. Each column string 504 is compared to each column expression of the one or more structural models. Each column string 504 is eliminated if it is an unacceptable or illegal combination of the one or more element types. Finally, if multiple matching column strings 504 are identified, the best match is determined through statistical data by a scoring or selection process.

The space string 502 is output from the major white region selection means 120 to the column string selection means 160. The space string 502 defines the relative locations between the document elements 470 and the major white regions 460 between and within the document elements 470 in the columns 501 of the unanalyzed document image 500. Then, the column string selection means 160 selects sequences of structural model element types that match the space string 502. The column string selection means 160 extracts substrings of the space string 502 that match an element expression for one or more of the element types defined in the structural model.

In FIG. 11, the space string 502 is "agcdcccgbjcdddd". The structural model element expression for the element type "heading" of a particular source document is represented by Equation 11:

$$\text{Heading}=([a-b]^*[f-g]|[f-g][a-b]^*[f-g]). \tag{11}$$

From the structural model rules outlined in the above example, the "heading" element cannot be placed at the bottom of the column. Therefore, the heading element expression does not end with the "$" character. The structural model element expression for the element type "body text" is represented by Equation 12:

$$\text{Body text}=([c-d]^*\$|^\wedge[c-d]^*[f-h]|[f-h][c-d]^*[f-h]| [f-h][c-d]^*\$). \tag{12}$$

The "heading" substrings "ag" and "gbf" match the "heading" element expression of Equation (11). Those "heading" substrings are stored, including the corresponding start and end positions, in the space string 502. The "body text" substrings "gcdcccg" and "fcdddd" match the "body text" element expression of Equation (12). Those "body text" substrings are also stored, including the corresponding start and end positions, in the space string 502.

The column string selection means 160 compiles a list of candidate column strings 504 of structural model element types that match the entire space string 502 of the unanalyzed document image 500. Candidate column strings 504 are generated using the positions of the matching substrings extracted from the space string that match element types. In particular, matching character codes representing the element type, are substituted for the extracted substrings, until all possible combinations of matching column strings 504 are determined. Multiple column strings 504 may be generated from one space string 502 and collected in the candidate column string list. The column string selection means 160 compares each candidate column string 504 appearing on the candidate column string list against the structural model column expression. If the column string 504 does not match the column expression, that column string 504 is removed from the list of candidate column strings. The remaining column strings 504 on the candidate column string list are acceptable or legal interpretations of the input document image column.

In the example shown in FIG. 11, the space string 502 is translated into only one candidate column string 504, the column string "HTHT".

If the column string selection means 160 determines that multiple candidate column strings 504 remain on the candidate column string list, the candidate list is output to the column expression comparison means 170. The column expression comparison means 170 chooses the remaining candidate column strings that best matches the structural model column expression. The document element identification system 100 has statistical data of major white region sizes that are categorized by their geometric relations to the element boundaries, e.g. within each document element type and between two document element types. The column expression comparison means 170 uses this statistical data to determine the best matching column string.

For example, if "Heading", "Body Text" and "Figure" are the three element types defined in the structural model, nine categories of geometric relationships are identified. The nine categories of geometric relationships include relationships interior to each of the "Body Text", "Heading" and "Figure" elements as shown by a double arrow in FIG. 12, and relationship between each pair of element types, as shown by a single arrow in FIG. 12. For each geometric relationship category, the mean value ($\mu$) and standard deviation ($\sigma$) are calculated and stored in the document element identification system 100. The column expression comparison means 170 determines each category of geometric relationship to which each major white region of the candidate column string 504 belongs. Then, the column expression comparison means 170 determines the likelihood that each major white region corresponds to the the geometric relationship category by comparing its size to the statistical samples.

If I possible matches remain, then each possible match $m_j$, where $j=1, \ldots, I$, comprises n white spaces. Assuming normal distribution, the likelihood p that a white space $w_i$,: where $i=1, \ldots, n$, corresponds to the remaining candidate column strings is calculated based on the statistical theory. The calculus is a probability function of the normal distribution, as set forth in Equation (13):

$$p(w_i) = \frac{1}{\sqrt{2\pi}\,\sigma_c} e^{\frac{-(x_i-\mu_c)^2}{2\sigma_c^2}} \tag{13}$$

where $x_1$ is a size of $w_1$, and $\mu_c$ and $\sigma_c$ are the mean value and the standard deviation of the category of white spaces to which $w_i$ belongs, respectively.

The score for each possible match is calculated as an average value of the likelihood values of all the white spaces. The score S of each possible match $m_j$ is set forth in Equation (14):

$$S(m_j) = \frac{1}{n} \sum_{i=1}^{n} p(w_i) \tag{14}$$

The best matching candidate column string 504 has the largest score S. Therefore, the candidate column string 504 having the largest score is selected as the matching column string 504. Finally, the document element identification system 100 segments the column image into the document elements and the corresponding logical tags are attached.

The document elements 470 of the unanalyzed document image 500, along with the corresponding logical tags from the matching column expression, can be stored in the memory or output to the processor 140 for further processing. For example, such further processing can include optical character recognition processing on specific ones of the document elements 470 based on the corresponding logical tags.

Figure 13:
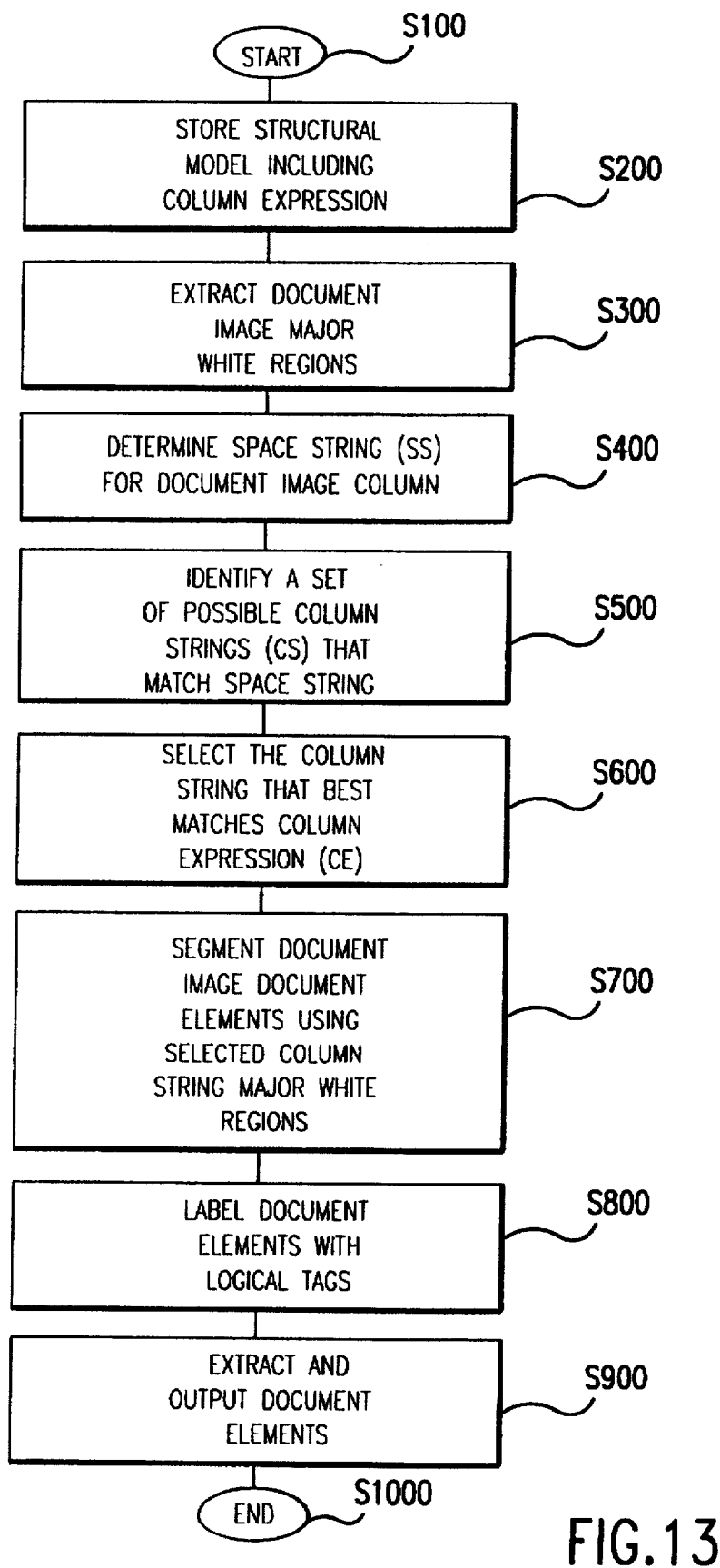
FIG. 13 is a flow chart outlining a preferred embodiment for logically tagging document elements in a columnar document image by major white region pattern matching.

One preferred embodiment of the method for identifying the document elements 470 using the stored structural model, including the column expression and element expressions for each identified element type in the structural model, is outlined in FIG. 13.

First, after starting in step S100, the structural model, including the column expression and required element expressions for the source document, is stored in the memory 130 of the document element identification system 100 in step S200.

In step S300, the document image major white regions are extracted. The document image major white regions are used to first identify the document image columns, and then the major white region sequence within each column. Once the document image major white regions are extracted, the space string for the document image column is determined in step S400. The processes after S400 should be repeated for each extracted column.

In step S500, a set of possible column strings that match the space string generated by the major white region selection means 120 is identified. In step S600, the column string from the candidate column string list which best matches the column expression defined in the structural model is selected.

In step S700, the document image elements are segmented using the selected column string major white regions. In step S800, the segmented document elements are labelled with the logical tags corresponding to the selected column string. In step S900, the document elements are extracted and output, for example, to the printer 300. Then, in step S1000, the process ends.

Figure 14:
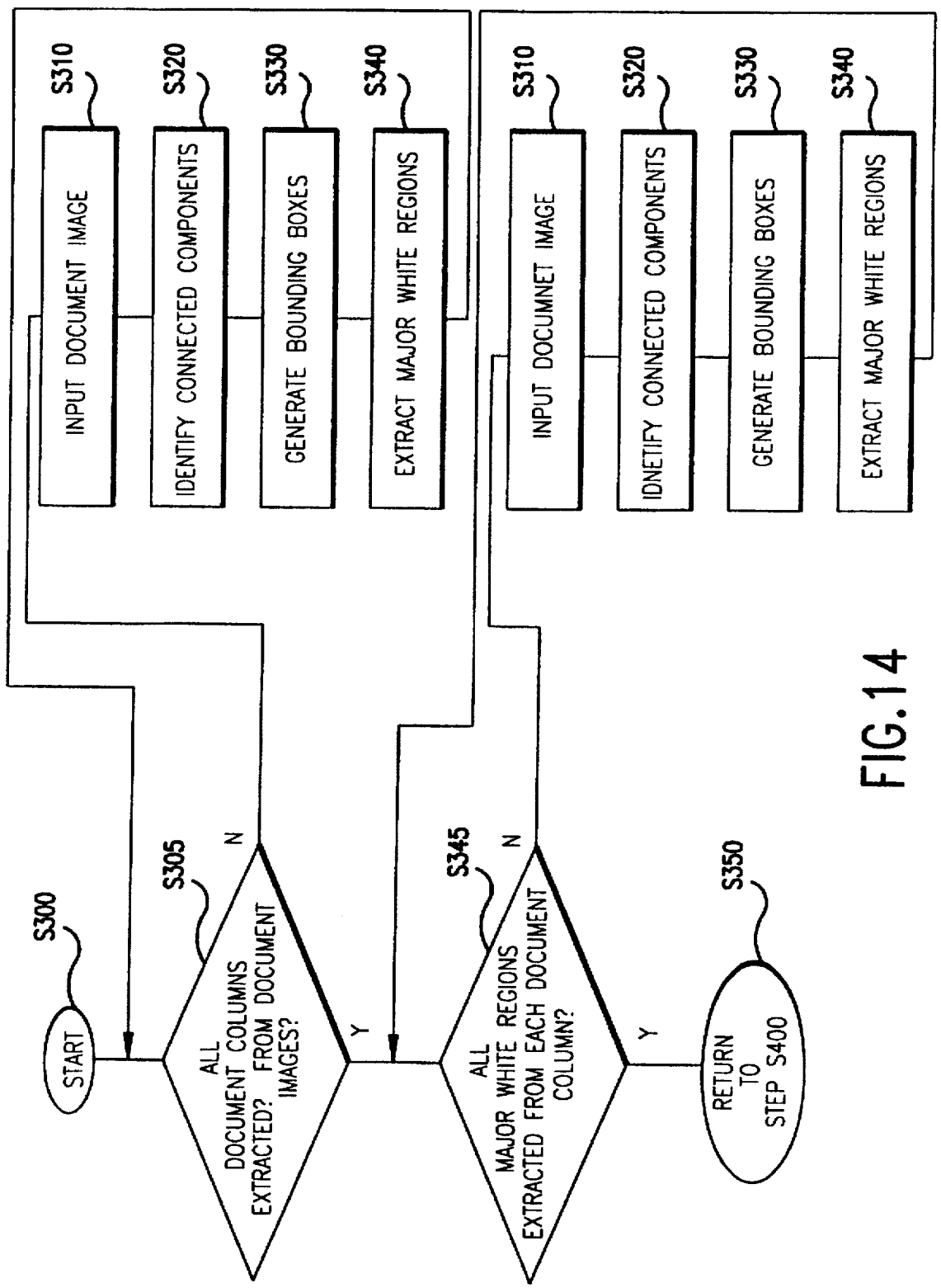
FIG. 14 is a flow chart outlining a preferred embodiment for extracting major white regions and document elements.

FIG. 14 outlines in greater detail one preferred embodiment of step S300 of FIG. 13 for extracting the document image major white regions 460. After starting in step S300, the document image 400 is input in step S310. The input document image 400 has a number of document elements 470. Then, in step S320, the connected components 410 of the document image 400 are identified. Next, in step S330, a bounding box 420 is generated for each of the connected components 410 identified in step S320. In step S340, the major white regions 460 are extracted. Major white regions are extracted for to identify each column. Once columns have been extracted in step S305, all horizontal white spaces extending between the left and right edges of the column regions are extracted in step S345 and are used to generate a space string. Then, in step S350, control returns to step S400.

Figure 15:
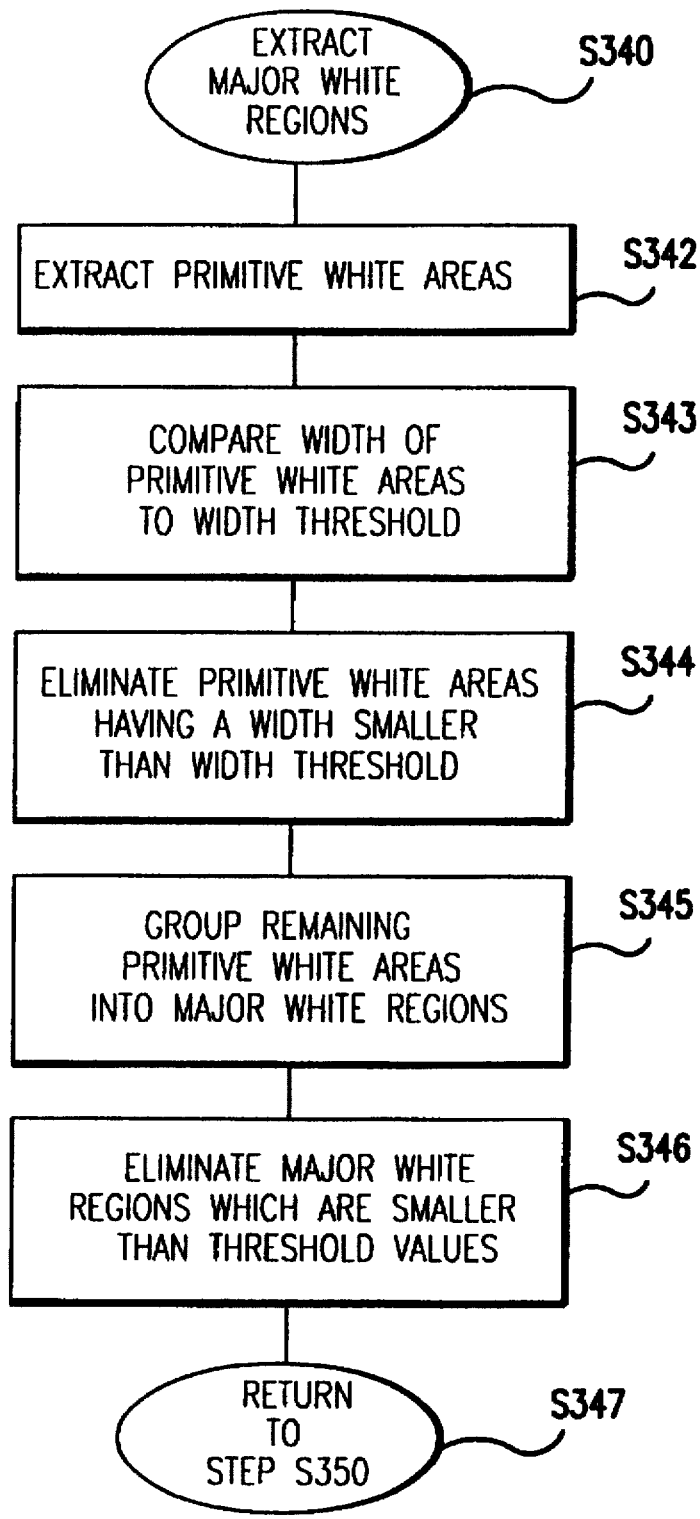
FIG. 15 is a flow chart outlining a preferred embodiment for extracting major white regions.

FIG. 15 outlines in greater detail one preferred embodiment of the step of extracting the major white regions of step S340 of FIG. 14. After starting in step S340, the primitive white areas 430 are extracted in step S342. As shown in FIG. 5, the primitive white areas 430 are rectangular-shaped areas of white space between the bounding boxes 420. Next, in step S343, the height and width of each horizontal primitive white area 430 is compared to a width threshold 440 and a height threshold 450, while the height and width of each vertical primitive white area 430 is compared to a width threshold 440' and a height threshold 450'. The horizontal width threshold 440 is preferably set to one-third of the horizontal length of the document image 400. The horizontal height threshold 450 is preferably set to a value less than the line spacing of the text in the document image. The vertical height threshold 450' is preferably set to one-third of the vertical length of the document image 400. The vertical width threshold 440' is preferably set to a value greater than the line spacing of the text in the document image. Primitive horizontal and vertical white areas having dimensions greater than the height thresholds (450, 450') and/or the width thresholds (450, 450') are determined to be major white regions.

Then, in step S344, the horizontal primitive white areas 430 having widths smaller than the horizontal width threshold 440 and the vertical white areas 430 having heights smaller than the vertical height threshold 450' are eliminated. In step S345, the remaining primitive white areas 430 are grouped and the major white regions 460 are determined. Finally, in step S346, those major white regions 460 which have at least one of their vertical or horizontal extents less than the corresponding vertical or horizontal threshold are eliminated. Alternately, only those major white regions 460 which have both their vertical and horizontal extends less than the corresponding thresholds are eliminated. In step S345, the remaining primitive white areas 430 are grouped to determine the major white regions 460. Many possible methods for implementing grouping of the remaining primitive white areas 430 into major white regions 460 are contemplated. One exemplary method is outlined in U.S. patent application Ser. No. 08/315,857, which provides a detailed disclosure of this exemplary method for grouping the remaining primitive white areas 430 into major white regions 460. Then, in step S347, control returns to step S350.

Figure 16:
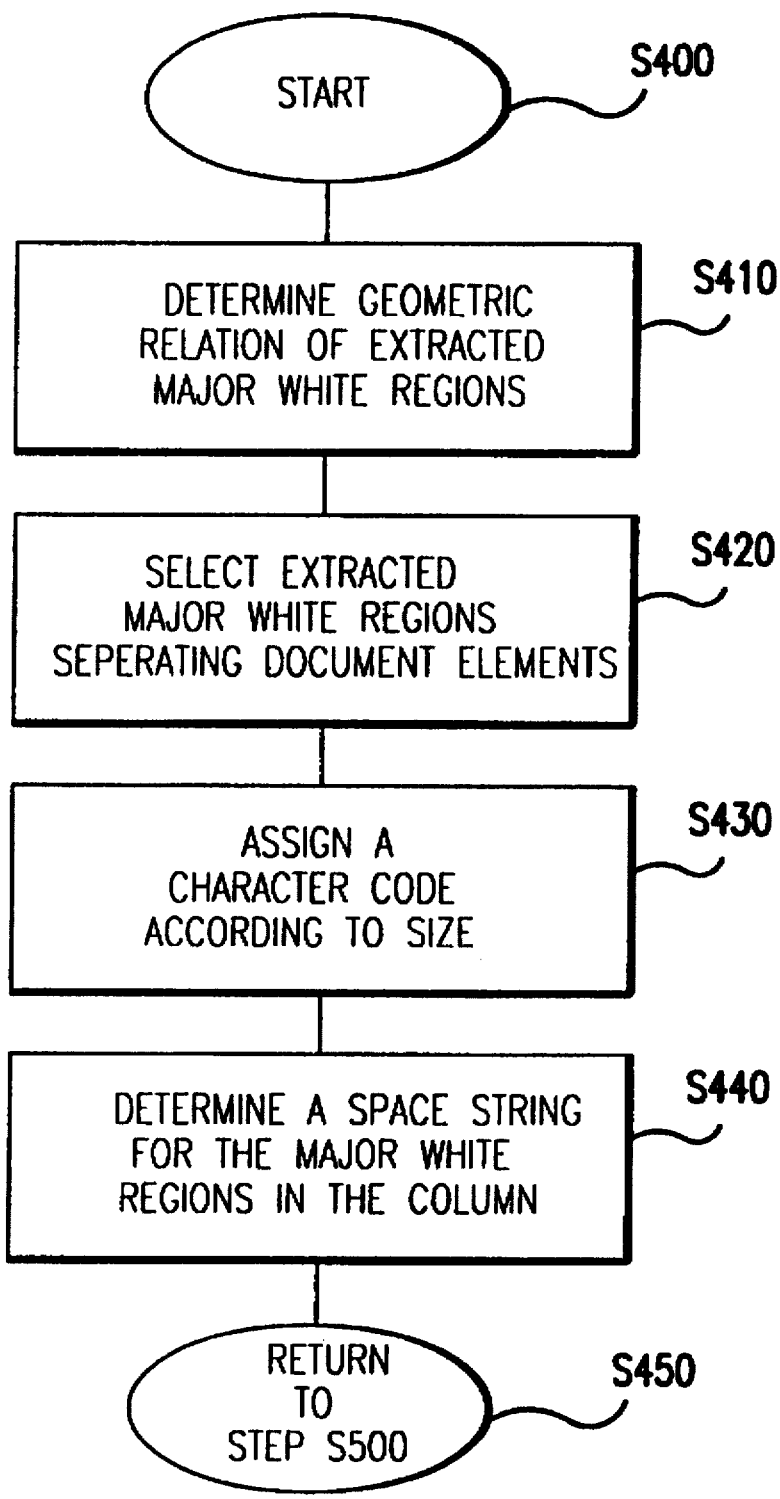
FIG. 16 is a flow chart outlining a preferred embodiment for determining a space string for an input document image.

FIG. 16 outlines one preferred embodiment of the process for determining the space string for the document image column of step S400. After starting in step S400, in step S410, the geometric relation of the extracted major white regions is determined. Then, in step S420, the extracted major white regions 460 that separate document elements 470 are selected. In step S430, a character code is assigned to each selected major white region according to its size. In step S440, a space string 502 is determined for the major white regions 460 contained in the entire document image column 501. Finally, in step S450, control returns to step S500.

In the example shown in FIG. 11, only the horizontal major white regions 460 are used to separate the vertically aligned document elements 470. The process can be generalized for multiple column documents. In the parent application, the method for determining a space string for a multi-column document image is disclosed in greater detail. Further, a technique for segmenting columns before the logical tagging in this application is disclosed in U.S. patent application Ser. No. 08/483,765, which is co-filed with this application and previously incorporated by reference.

Figure 17:
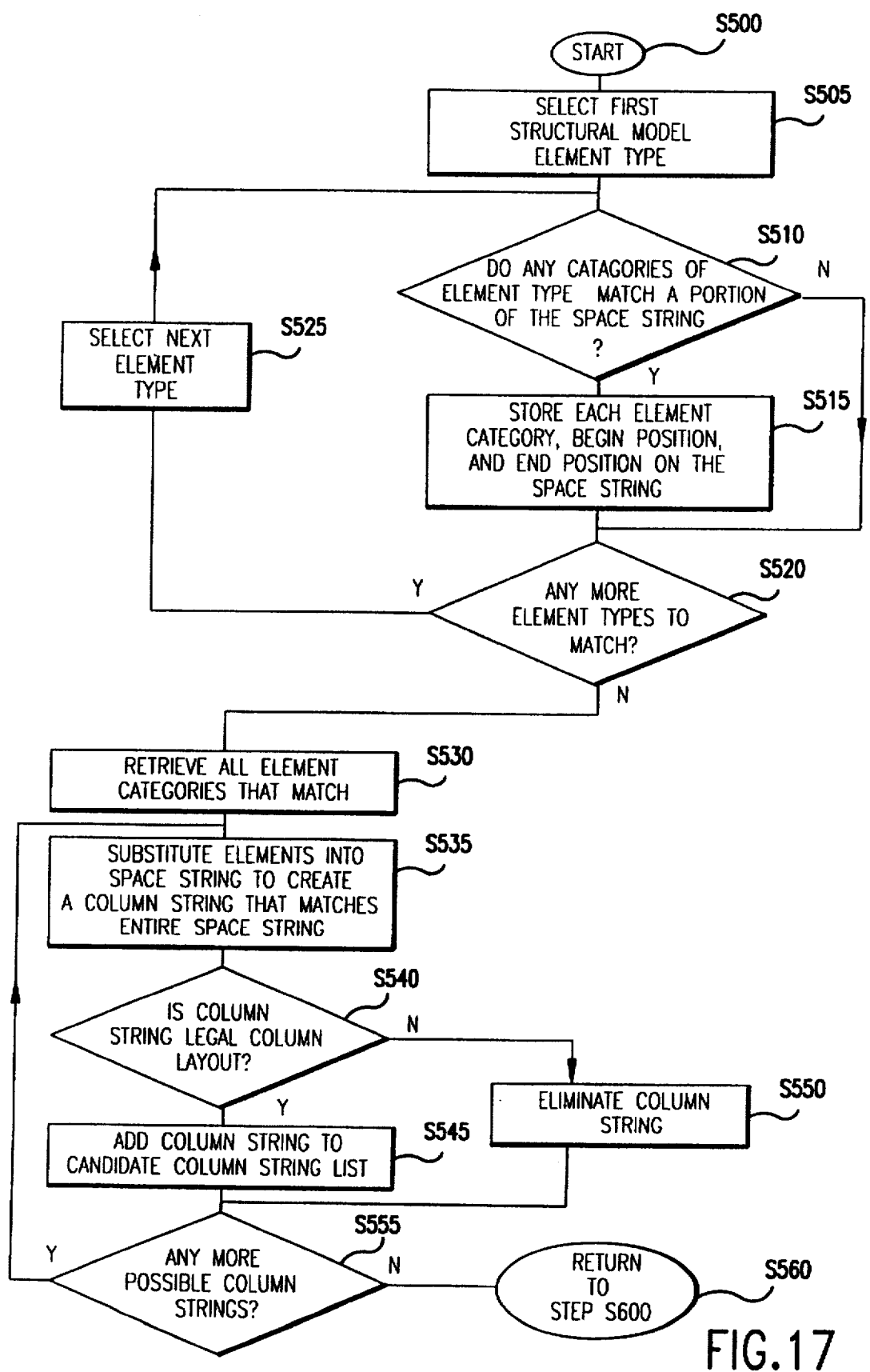
FIG. 17 is a flow chart outlining a preferred embodiment for identifying the candidate column string list.

FIG. 17 outlines one preferred embodiment of the column string selection process of step S500. After starting in step S500, in step S505, the structural model element type is selected. Then, in step S510 all element expressions of the selected element type are compared to the space string 502. Then is step S515, it is determined if any element expression matches a portion of the space string 502. If a category of the element type or element expression matches a portion of the space string, control continues to step S520. In step S520, each element expression that matches a portion of the space string is stored, for example, in the memory 130. Along with the matching element expression, at least the corresponding beginning position of the space string and the corresponding end position of the space string is stored in the memory 130. After each type category and related data is stored in step S520, control continues to step S525. However, if in step S515, no categories of the element type match a portion of the space string 502, control jumps directly to step S525.

In step S525, the structural model is checked to determine if any more element types of the structural model remain to be compared to the space string 502. If any element types remain to be compared, control jumps to step S525, where the next element type is selected. Then, control jumps back to step S510. However, if all element types defined by the structural model have been compared to the space string 502, control continues from step S525 to step S530.

In step S530, all element expression of each element type identified in the structural model that match a portion of the space string 502 are retrieved from the memory 130. In step S535, the various element expressions that match a portion of the space string are combined to create a column string 504 that also matches the entire space string. In step S540, the column string 504 is checked against the column expression defined in the structural model to determine if the column string 504 is a legal or acceptable column layout for the source document corresponding to the structural model.

If the identified column string 504 is determined to be a legal column layout in step S540, control continues to step S545. In step S545, the column string 504 is added to the candidate column string list. Control jumps to step S555. However, if the column string identified in step S535 is determined to be an illegal column layout in step S540, control jumps to step S550. In step S550, the identified column string is discarded. Control then continues to step S555.

If step S555, the column string selection means 160 determines if any additional column strings 504 can be compiled from the matching element categories. If additional column strings are possible, control jumps back to step S535, where another column string is identified. If, in step S555, all possible column strings have been identified, then control continues to steps S560. In step S560, control returns to step 600.

Figure 18:
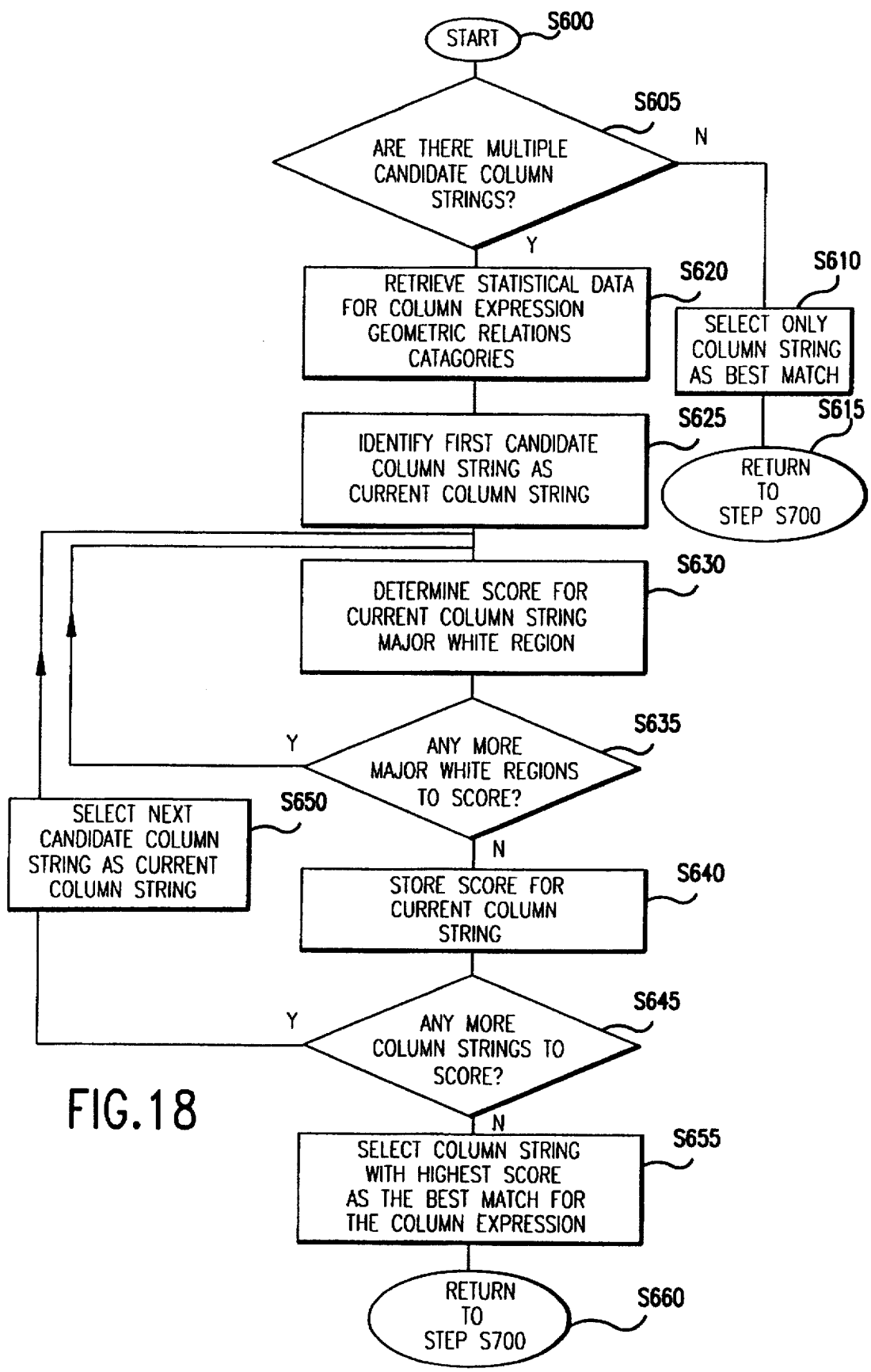
FIG. 18 is a flow chart outlining a preferred embodiment for selecting the best match of the column expression from the candidate column string list.

FIG. 18 outlines one preferred embodiment of the best matching column string selection process of step S600. After starting in step S600, in step S605, the candidate column string list is checked to see if there is more than one candidate string 504 on the candidate column string list. If there is only one candidate column string, control continues to step S610. In step S610, the column string on the candidate column string list is selected as the best match for the column expression. Then, control continues to step S615, which returns control to step S700.

If the candidate column string list is determined to contain more than one candidate column string, in step S605, control jumps to step S620. In step S620, statistical data for the column expression geometric relationship categories are retrieved. In step S625, a first candidate column string is identified as a current column string. In step S630, a score is determined according to Equation 13 for a first major white region of the current column string. Equation 13 is used for scoring each white major white region in the column string. Then, in step S635, the current column string is checked to determine if any additional major white regions remain to be scored. If any major white regions remain to be scored, control jumps back to step S630. If all major white regions in the current column string have been scored control continues from step S635 to step S640. In step S640, the combined or total score for the current column string is determined according to equation 14 and stored, for example, in memory 130.

Then, in step S645, the candidate column string list is checked to see if any more column strings remain to be scored. If any candidate column strings remain to be scored, control continues to step S650. In step S650, the next candidate column string selected as the current column string and control jumps back to step S630. After all candidate column strings are determined to have been scored in step 645, control jumps to step S655. In step S655, the column string with the highest score is selected as the best match for the column expression. Then, in step S660, control returns to step S700.

Figure 12:
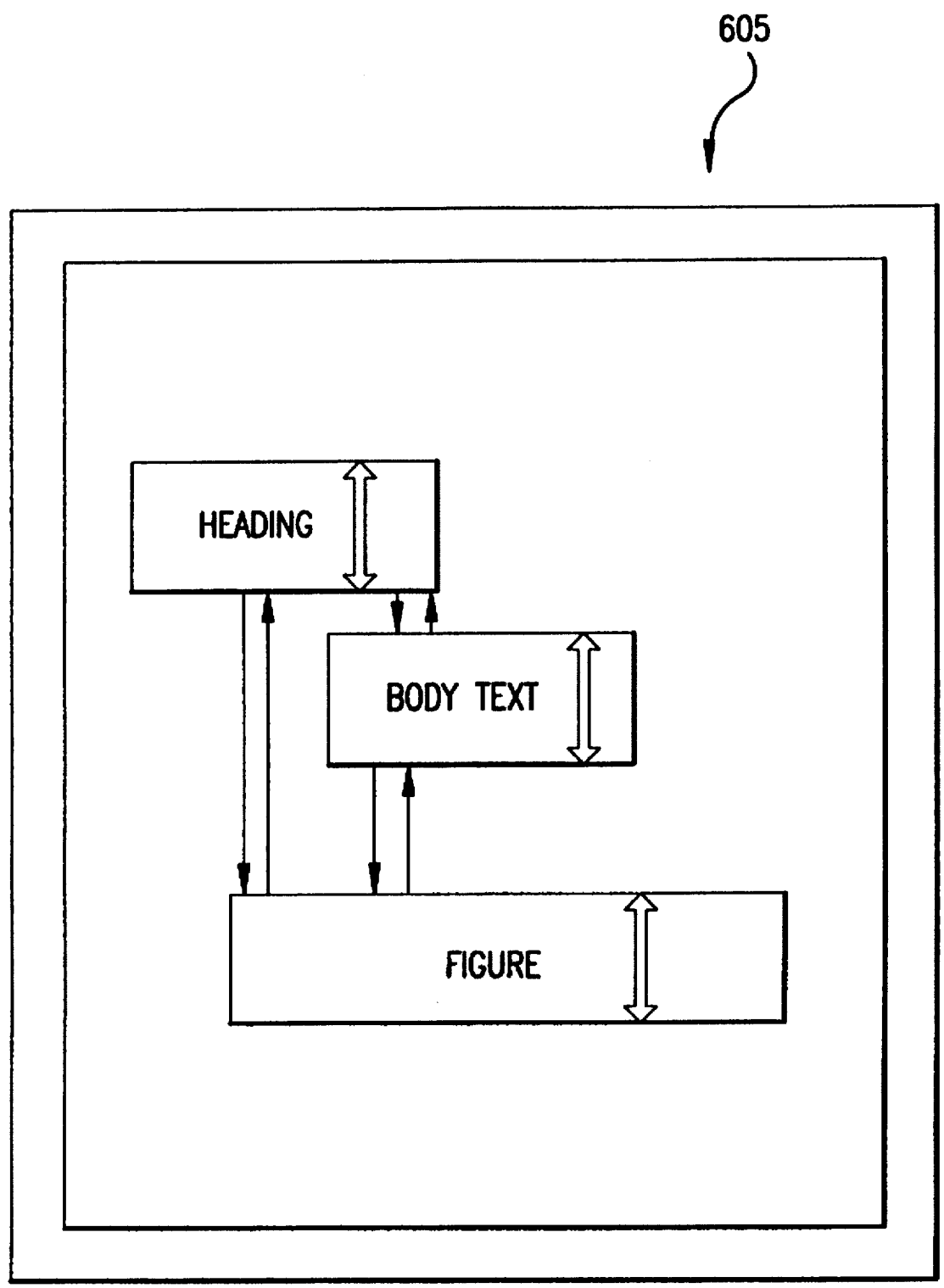
FIG. 12 shows the major white region geometric relations for a structural model with three element types: heading, figure and body text.
Figure 19:
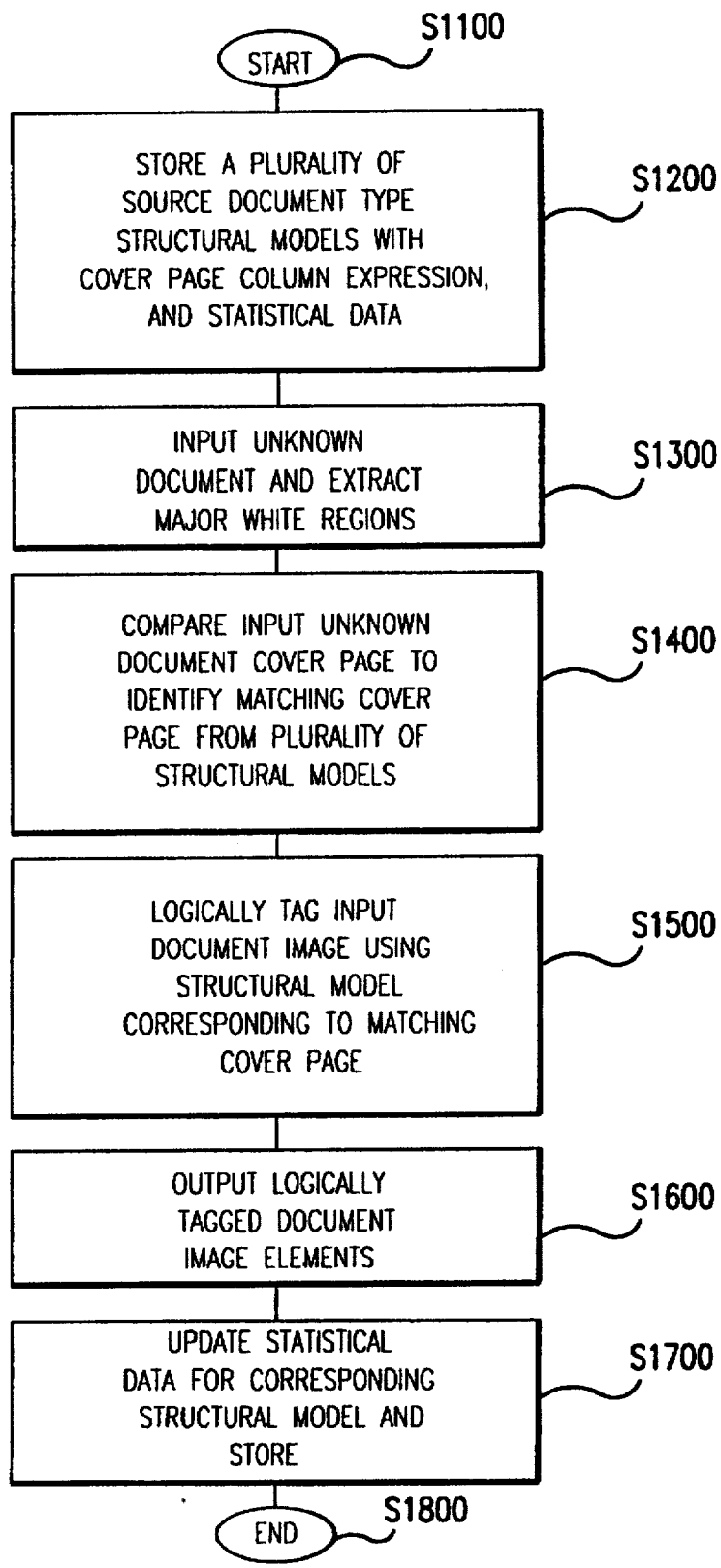
FIG. 19 is a flow chart outlining a second preferred embodiment for logically tagging the document elements in a corresponding document after identifying the source document type.

FIG. 19 outlines one preferred embodiment of a method for logically tagging document elements 470 in the column by major white region pattern matching for an unknown input document. First, after starting in step S1100, in step S1200 the structural model for a plurality of known source document types are stored in a document element identification system. The structural model includes at least a cover page, a column expression, and statistical information about the probable size of the major white region separating categories of geometric relations between and within element types defined in the structural model. FIG. 12 shows the geometric relations requiring statistical data for a structural model with three defined element types: "Heading", "Body Text" and "Figure".

In step S1300, the unknown input document including a cover page and containing the document elements to be logically tagged is input into the document element identification system. The input document image has the major white regions extracted to segment the input document image into columns, and then the segmented document image columns are stored for later analysis.

In step S1400, the unknown segmented input document cover page image is retrieved and compared to the plurality of stored source document type cover pages to identify the matching cover page of the plurality of cover pages. The matching cover page identifies the unknown input document type and allows the corresponding structural model for the newly identified input document type to be retrieved from storage. The process of identifying cover pages for a plurality of publications is described in the parent application, U.S. patent application Ser. No. 08/315,857. Alternatively, a user could be prompted by the document element identification system to manually identify the unknown input document type. After the unknown input document type was provided by a user, the corresponding structural model could be retrieved.

In step S1500, the document element identification system uses the corresponding structural model to segment and logically tag the document elements in the segmented columns of the input document image.

In step S1600, the logically tagged document elements in the input document image are extracted and output, for example, to the printer 200 or a storage device.

In step S1700, the document element identification system retrieves the statistical data for the geometric relations between document elements for the input document images that were logically tagged in step S1500, and then updates the statistical data in the identified corresponding structural model for the geometric relations between and within document elements. The corresponding structural model including the updated statistical geometric relations data is then re-stored. Then, in step S1800 the method ends.

The preceding descriptions of the preferred embodiments of this invention is illustrative only. One of skill in the art will appreciate that the invention can include a variety of data processing configurations. Therefore, the preceding description is not intended to be exhaustive or to limit the scope of the invention as set forth in the appended claims.

What is claimed is:

1. A method for logically identifying document elements in a document image, comprising the steps of:

providing at least one structural model of a corresponding source document having at least one column having at least one document element, each structural model comprising at least one column expression comprising at least one corresponding document element expression that defines each of the at least one document element, said at least one column expression defining relationships between the at least one document element of the source document;

identifying first major background regions in the document image, the first major background regions segmenting the document image into at least one column;

identifying second major background regions in each of the at least one column, each document element expression defining at least a size of second major background regions within each category of the document element;

assembling a major background region pattern for each column of the document image from the identified second major background regions;

generating at least one matching column string of one or more document elements having second major background regions matching the major background region pattern for each column of the document image; and determining a best column string from the at least one matching column string, the best column string most closely matching a column expression of the at least one structural model; and logically identifying each of the at least one document element of the document image based on the best column string.

2. The method of claim 1, wherein the structural model providing step comprises the steps of:

determining the at least one element expression, each at least one element expression corresponding to at least one document element type of the source document.

3. The method of claim 2, wherein the element expression determining step comprises:

identifying a category of elements for each of the at least one document element type;

developing major background region criteria for each category of elements;

determining an element regular expression based on the major background region criteria; and assembling an element expression from the element regular expressions for each at least one document element type.

4. The method of claim 2, wherein the element expression determining step comprises the element expression being provided beforehand.

5. The method of claim 2, wherein the element expression determining step comprises the step of analyzing a specific example of the source document to determine the element expression.

6. The method of claim 10 wherein the step of assembling a major background region pattern of the document image further comprises:

identifying a height of each identified second major background region for each column of the document image;

assigning a character code according to a size of each identified major background region;

concatenating the character codes into a space string for each column; and determining the major background region pattern based on the space string.

7. The method of claim 1, wherein the step of generating at least one matching column string comprises:

setting a first element type to a current element type;

identifying each category of elements of the current element type that matches a portion of the major background region pattern for the column as a candidate element;

assembling a set of the candidate elements by adding the identified candidate element to the set of candidate elements;

repeating the identifying step and the assembling step for each category of the current element type;

setting a next element type to be the current element type;

repeating the identifying step through the next element type setting step for each of the element types;

determining a column string for a sequence of the set of candidate elements that completely matches the major background region pattern;

adding the column string to a candidate column string list; and repeating the determining a column string step and the adding step until all sequences of the set of candidate elements that completely match the major background pattern are determined.

8. The method of claim 1, wherein the determining the best column string step comprises:

comparing the at least one matching column string to the column expression;

discarding each of the at least one column strings that are not a defined sequence included in the column expression;

determining a score for each remaining column based on a statistical comparison between the at least one matching column string to the at least on column expression; and selecting the column string having a highest score as the best column string.

9. The method of claim 8, wherein the score determining step comprises:

retrieving statistical information for the column expression;

selecting a first one of the matching column strings;

locating a top of the column string;

identifying a next major background region within the column string;

determine an initial score for the identified major background region based on the statistical information;

adding the initial score to a final score;

repeating the identifying step to the adding step until a bottom of the column string is located;

storing the final score for the candidate column string into a memory;

selecting a next one of the candidate column string list;

repeating the locating step to the selecting a next one of the candidate column string list until each one of the set of acceptable column strings has been scored; and retrieving the candidate column string with a highest final score.

10. A method of logically identifying document elements in a document image, comprising the steps of:

storing in a memory a plurality of structural models corresponding to a plurality of document types, wherein each of the structural models includes a cover page and at least one column expression defining the relationships between the document elements and defining at least a regular expression representing second major background regions within each type of document element;

inputting an input document to create a document image to evaluate; wherein the document image includes at least a cover page image;

extracting first major background regions to segment the document image into at least one column and extracting the second major background regions in the at least one column to segment at least one document element in the image cover sheet;

comparing the image cover page image to the plurality of structural models cover pages to select a matching cover page;

logically tagging the document elements in a remainder of the document image of the input document image using the second major background regions of the remainder and the column expression of a matching structural model that corresponds to the matching cover page; and updating a statistical information data set for the matching structural model with statistical data from the logically tagged input document image.

11. A document element identifying system for logically identifying document elements in a document image, comprising:

a memory for storing a plurality of stored structural models;

a document background region extraction system;

major background region selection means for selecting first major background regions extracted by the background region extraction system from the document image to identify at least one column in the document image and for selecting second major background regions extracted by the background region extraction system within each of the at least one column, wherein the second major background regions are assembled into a major background region pattern for each of the at least one column;

column string selection means for selecting a set of column strings from at least one document element expression of the structural model that match the major background region pattern for each of the at least one column, wherein each document element expression defines a corresponding document element type, each element expression defining at least a size of second major background regions within the document element type;

column expression comparison means for selecting a best match for the column expression and the major background region pattern of the document image from the set of column strings;

extraction means extracting the document elements of the document image based on the best match column expression; and a processor controlling the document background region extraction system, the major background region selecting means, the column string selection means, the column expression comparison means, and the extraction means.

12. The document element identifying system according to claim 11, wherein the column string selection means for the comprises:

pattern determining means for assemblying a major background region pattern for each of the at least one column from the selected second major background regions;

element expression comparison means for selecting a set of elements that match a portion of the major background region pattern selected from the document image; and column string identification means for identifying all combinations of the set of matching elements that match all the major background regions identified in a column of the document image.

* * * * *